United States Patent
Aoyama

(10) Patent No.: US 12,516,264 B2
(45) Date of Patent: Jan. 6, 2026

(54) SURFACE TREATMENT AGENT, ARTICLE, AND METHOD FOR MANUFACTURING ARTICLE

(71) Applicant: AGC Inc., Tokyo (JP)

(72) Inventor: Motoshi Aoyama, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/758,567

(22) Filed: Jun. 28, 2024

(65) Prior Publication Data

US 2024/0368494 A1   Nov. 7, 2024

Related U.S. Application Data

(63) Continuation of application No. PCT/JP2022/048309, filed on Dec. 27, 2022.

(30) Foreign Application Priority Data

Jan. 11, 2022 (JP) .................... 2022-002193

(51) Int. Cl.
  *C10M 155/02* (2006.01)
  *C10M 125/18* (2006.01)
  *C10M 139/00* (2006.01)
  *C10N 50/02* (2006.01)

(52) U.S. Cl.
  CPC ........ *C10M 155/02* (2013.01); *C10M 125/18* (2013.01); *C10M 139/00* (2013.01); *C10M 2201/081* (2013.01); *C10M 2227/06* (2013.01); *C10M 2229/051* (2013.01); *C10N 2050/02* (2013.01)

(58) Field of Classification Search
  CPC ............ C10M 155/02; C10M 125/18; C10M 139/00; C10M 2201/081; C10M 2227/06; C10M 2229/051; C10N 2050/02; B32B 9/00; C09D 171/02; C09D 183/04; C09D 5/1662; C09D 5/1687; C09D 7/61; C09D 7/63; C09K 3/18; C23C 14/06; C23C 14/24
  See application file for complete search history.

(56) References Cited

U.S. PATENT DOCUMENTS

| | | | |
|---|---|---|---|
| 6,127,498 A | 10/2000 | Tonelli et al. | |
| 6,183,872 B1 | 2/2001 | Tanaka et al. | |
| 6,200,684 B1 | 3/2001 | Yamaguchi et al. | |
| 2010/0129672 A1 | 5/2010 | Hao et al. | |
| 2012/0077041 A1 | 3/2012 | Yamane et al. | |
| 2014/0287240 A1 | 9/2014 | Murotani et al. | |
| 2014/0287246 A1 | 9/2014 | Murotani et al. | |
| 2014/0302332 A1 | 10/2014 | Murotani et al. | |
| 2015/0274889 A1 | 10/2015 | Sakoh et al. | |
| 2015/0307719 A1 | 10/2015 | Mitsuhashi et al. | |
| 2015/0315443 A1 | 11/2015 | Takeda et al. | |
| 2016/0009929 A1 | 1/2016 | Hoshino et al. | |
| 2016/0264788 A1 | 9/2016 | Hoshino et al. | |
| 2016/0304665 A1* | 10/2016 | Sakoh ...................... C09D 5/00 |
| 2016/0319071 A1 | 11/2016 | Sakoh et al. | |
| 2016/0355638 A1 | 12/2016 | Sakoh et al. | |
| 2018/0142062 A1 | 5/2018 | Hoshino et al. | |
| 2018/0148606 A1 | 5/2018 | Hoshino et al. | |
| 2019/0002635 A1 | 1/2019 | Mitsuhashi et al. | |
| 2019/0040266 A1 | 2/2019 | Hoshino et al. | |
| 2020/0002551 A1 | 1/2020 | Mitsuhashi et al. | |
| 2020/0056067 A1 | 2/2020 | Mitsuhashi et al. | |
| 2020/0071251 A1 | 3/2020 | Hoshino et al. | |
| 2020/0157376 A1 | 5/2020 | Hoshino et al. | |
| 2020/0165273 A1 | 5/2020 | Hoshino et al. | |
| 2020/0165384 A1 | 5/2020 | Hoshino et al. | |
| 2020/0165385 A1 | 5/2020 | Uno et al. | |
| 2020/0231747 A1 | 7/2020 | Furukawa et al. | |
| 2020/0354520 A1 | 11/2020 | Mitsuhashi et al. | |
| 2022/0135839 A1 | 5/2022 | Nomura et al. | |

FOREIGN PATENT DOCUMENTS

| | | |
|---|---|---|
| EP | 0 933 377 A2 | 8/1999 |
| JP | 11-29585 A | 2/1999 |
| JP | 2874715 B2 | 3/1999 |
| JP | 2000-144097 A | 5/2000 |
| JP | 2000-327772 A | 11/2000 |
| JP | 2002-506887 A | 3/2002 |
| JP | 2008-534696 A | 8/2008 |
| JP | 4138936 B2 | 8/2008 |
| JP | 2012-72272 A1 | 4/2012 |
| JP | 2014-70163 A | 4/2014 |
| JP | 2014-80473 A | 5/2014 |

(Continued)

OTHER PUBLICATIONS

International Search Report issued Mar. 14, 2023 in PCT/JP2022/048309 filed Dec. 27, 2022, 3 pages.

*Primary Examiner* — Taiwo Oladapo
(74) *Attorney, Agent, or Firm* — Oblon, McClelland, Maier & Neustadt, L.L.P.

(57) ABSTRACT

A surface treatment agent from which a surface layer having an excellent friction resistance can be formed, an article including such a surface layer, and a method for manufacturing such an article are provided. A surface treatment agent according to the present invention contains a fluorine-containing ether compound including a fluoro-polyether chain and a reactive silyl group; a first metallic compound containing a first metallic element; and a second metallic compound containing a second metallic element different from the first metallic element.

20 Claims, No Drawings

(56) References Cited

FOREIGN PATENT DOCUMENTS

| | | | |
|---|---|---|---|
| JP | 2014-218639 A | 11/2014 | |
| JP | 2015-199906 A | 11/2015 | |
| JP | 2016-204656 A | 12/2016 | |
| JP | 2016-210854 A | 12/2016 | |
| JP | 2016-222859 A | 12/2016 | |
| JP | 2019-44158 A | 3/2019 | |
| JP | 2019-131807 A | 8/2019 | |
| JP | 2021-17581 A | 2/2021 | |
| WO | WO 99/37720 A1 | 7/1999 | |
| WO | WO-03040247 A1 * | 5/2003 | ........... C08G 65/007 |
| WO | WO 2006/107083 A2 | 10/2006 | |
| WO | WO 2011/059430 A1 | 5/2011 | |
| WO | WO 2011/060047 A1 | 5/2011 | |
| WO | WO 2012/064649 A1 | 5/2012 | |
| WO | WO 2013/042732 A1 | 3/2013 | |
| WO | WO 2013/121984 A1 | 8/2013 | |
| WO | WO 2013/121985 A1 | 8/2013 | |
| WO | WO 2013/121986 A1 | 8/2013 | |
| WO | WO 2014/126064 A1 | 8/2014 | |
| WO | WO 2014/163004 A1 | 10/2014 | |
| WO | WO 2015/087902 A1 | 6/2015 | |
| WO | WO 2017/022437 A1 | 2/2017 | |
| WO | WO 2017/038830 A1 | 3/2017 | |
| WO | WO 2017/038832 A1 | 3/2017 | |
| WO | WO 2017/187775 A1 | 11/2017 | |
| WO | WO 2018/079743 A1 | 5/2018 | |
| WO | WO 2018/143433 A1 | 8/2018 | |
| WO | WO 2018/216630 A1 | 11/2018 | |
| WO | WO 2019/039186 A1 | 2/2019 | |
| WO | WO 2019/039226 A1 | 2/2019 | |
| WO | WO 2019/039341 A1 | 2/2019 | |
| WO | WO 2019/044479 A1 | 3/2019 | |
| WO | WO 2019/163282 A1 | 8/2019 | |

* cited by examiner

SURFACE TREATMENT AGENT, ARTICLE, AND METHOD FOR MANUFACTURING ARTICLE

INCORPORATION BY REFERENCE

This application is based upon and claims the benefit of priority from Japanese patent application 2022-002193, filed on Jan. 11, 2022, and PCT application No. PCT/JP2022/048309 filed on Dec. 27, 2022, the disclosure of which is incorporated herein in its entirety by reference.

BACKGROUND

The present invention relates to a surface treatment agent, an article, and a method for manufacturing an article.

It has been known that in order to impart water and oil repellency, an antifouling property, and the like to the surface of a substrate, a surface layer consisting of a condensate of a fluorine-containing ether compound is formed on the surface of the substrate through a surface treatment using a fluorine-containing ether compound having a fluoro-polyether chain and a reactive silyl group.

Japanese Unexamined Patent Application Publication No. 2021-017581 discloses that a surface layer is formed by using a surface treatment agent containing a fluorine-containing ether compound and a metallic compound containing tantalum (Ta).

SUMMARY

In recent years, it has been demanded that properties a surface layer formed by using a fluorine-containing ether compound is required to have should be further improved. For example, as a touch panel or the like is repeatedly rubbed by fingers, it is desired to further improve the friction resistance of a surface layer formed on a surface of a component such as a touch panel which is repeatedly rubbed by fingers.

The inventors of the present application have evaluated surface layers formed by using a surface treatment agent containing a fluorine-containing ether compound and one metallic compound (i.e., one type of metallic compound) by referring to the surface treatment agent disclosed in Japanese Unexamined Patent Application Publication No. 2021-017581, and found that there is room for improving friction resistance of the surface layers.

Accordingly, an object of the present invention is to provide a surface treatment agent from which a surface layer having an excellent friction resistance can be formed, an article including such a surface layer, and a method for manufacturing such an article.

As a result of diligent examinations in regard to the above-described problem, the inventors of the present application have found that the use of a surface treatment agent containing a fluorine-containing ether compound and two or more metallic compounds makes it possible to form a surface layer having an excellent friction resistance, and thereby made the present invention.

That is, the inventors of the present application have found that the above-described problem can be solved by the below-shown features.

[1] A surface treatment agent containing: a fluorine-containing ether compound including a fluoro-polyether chain and a reactive silyl group; a first metallic compound containing a first metallic element; and a second metallic compound containing a second metallic element different from the first metallic element.

[2] The surface treatment agent described in Item [1] wherein the first metallic element is a metallic element having a Pauling electronegativity higher than 1.00.

[3] The surface treatment agent described in Item [2] wherein the first metallic element is a metallic element having a Pauling electronegativity of 2.00 or higher, and the second metallic element is a metallic element having a Pauling electronegativity of 1.00 or lower or a metallic element having a Pauling electronegativity higher than 1.00 and lower than 2.00.

[4] The surface treatment agent described in any one of Items [1] to [3] wherein a total content of the first and second metallic compounds is 0.1 mass ppb to 1 mass % based on a total mass of the surface treatment agent.

[5] The surface treatment agent described in any one of Items [1] to [3], wherein a total content of the first and second metallic compounds is 0.1 mass ppb to 1 mass % based on a total mass of the fluorine-containing ether compound contained in the surface treatment agent.

[6] The surface treatment agent described in any one of Items [1] to [5], further containing a liquid medium.

[7] An article including a surface layer formed, on a substrate, from a surface treatment agent described in any one of the above-described Items [1] to [6].

[8] A method for manufacturing an article, including forming a surface layer on a substrate by a dry-coating method or a wet-coating method by using a surface treatment agent described in any one of the above-described Items [1] to [6].

The above and other objects, features and advantages of the present disclosure will become more fully understood from the detailed description given hereinbelow and the accompanying drawings which are given by way of illustration only, and thus are not to be considered as limiting the present disclosure.

According to the present invention, it is possible to provide a surface treatment agent from which a surface layer having an excellent friction resistance can be formed, an article including such a surface layer, and a method for manufacturing such an article.

DESCRIPTION OF EMBODIMENTS

In this specification, a group represented by Formula (g1) may be expressed as a group (g1). Further, a compound represented by Formula (A1) may be expressed as Compound (A1). Compounds represented by other formulas are also expressed in a similar manner. A fluoroalkyl group is a collective term for a perfluoroalkyl group and a partial fluoroalkyl group.

A perfluoroalkyl group is a group in which all the hydrogen atoms of the alkyl group are replaced by fluorine atoms. Further, a partial fluoroalkyl group is an alkyl group in which at least one hydrogen atom is replaced by a fluorine atom and which has at least one hydrogen atom. That is, a fluoroalkyl group is an alkyl group having at least one fluorine atom.

A "reactive silyl group" is a collective term for a hydrolytic silyl group and a silanol group (Si—OH), and the "hydrolytic silyl group" means a group that can form a silanol group through a hydrolysis reaction.

An "organic group" means a hydrocarbon group which may have a substituent and have a heteroatom or other bonds in a carbon chain.

The "hydrocarbon group" is a group consisting of a carbon atom(s) and a hydrogen atom(s) and is a group consisting of an aliphatic hydrocarbon group (e.g., as a divalent aliphatic hydrocarbon group, a linear alkylene group, a branched alkylene group, a cycloalkylene group or the like), an aromatic hydrocarbon group (e.g., as a divalent aromatic hydrocarbon group, a phenylene group or the like), and a combination thereof.

A "surface layer" means a layer formed on a substrate.

The "molecular weight" of a fluoro-polyether chain is a number-average molecular weight calculated, by obtaining the number (average value) of oxyfluoro-alkylene units based on the end group, by $^1$H-NMR and $^{19}$F-NMR.

A symbol "-" (or "to"), which indicates a range of numerical values, means that values in front of and behind this symbol are included in the range as lower and upper limits, respectively.

The "electronegativity" means a Pauling electronegativity unless otherwise specified.

The "ppb" means "parts-per-billion (10-9)" and represents a mass ratio.

[Surface Treatment Agent]

A surface treatment agent according to the present invention (hereinafter also referred to as "the surface treatment agent") contains a fluorine-containing ether compound having a fluoro-polyether chain and a reactive silyl group, and a first metallic compound containing a first metallic element and a second metallic compound containing a second metallic element different from the first metallic element.

The surface treatment agent makes it possible to form a surface layer having an excellent friction resistance. The details of the reason for this feature are not elucidated, but it is inferred that this feature is obtained by the following reasons.

A surface layer may be formed in contact with a substrate, which contains a silanol group on surface like a glass substrate, or an underlayer. It is considered that, in such a case, a metallic element contained in the surface layer improves reactivity between a silanol group derived from a reactive silyl group of the fluorine-containing ether compound and a silanol group present in the surface of the substrate or the like. It is inferred that, as a result, the surface layer and the substrate firmly adhere to each other.

Further, it is inferred that by using two or more metallic compounds (i.e., two or more types of metallic compounds) containing metallic elements different from each other (i.e., metallic elements of types different from each other), these metallic elements will function in a complementary manner, so that the friction resistance of the surface layer is improved even further.

<Fluorine-Containing Ether Compound>

A fluorine-containing ether compound has a fluoro-polyether chain and a reactive silyl group.

Since a fluorine-containing ether compound has a fluoro-polyether chain, a surface layer obtained by using the fluorine-containing ether compound is excellent in water and oil repellency and fingerprint stain removal property.

A fluorine-containing ether compound has a reactive silyl group. Since the reactive silyl group is strongly chemically bonded to a substrate, an obtained surface layer has an excellent friction resistance.

A fluoro-polyether chain is a group having at least two oxyfluoro-alkylene units.

A fluoro-polyether chain may have a hydrogen atom. To achieve a more excellent friction resistance and a fingerprint stain removal property of the surface layer, the ratio of fluorine atoms in the fluoro-polyether chain represented by the below-shown Expression (I) is preferably 60% or higher, more preferably 80% or higher, and still more preferably substantially 100%, i.e., the fluoro-polyether chain is a perfluoro-polyether chain. When the amount of fluorine atoms is 60% or higher, the amount of fluorine in the fluoro-polyether chain is increased, so that the lubricity and the fingerprint removal property are further improved.

Ratio of fluorine atoms (%)=(Number of fluorine atoms)/{(Number of fluorine atoms)+(Number of hydrogen atoms)}×100       Expression (I)

To achieve both the fingerprint stain removal property and the lubricity of the surface layer, the molecular weight of one fluoro-polyether chain is preferably 2,000-20,000, more preferably 2,500-15,000, and still more preferably 3,000-10,000. When the molecular weight of the fluoro-polyether chain is 2,000 or larger, the flexibility of the fluoro-polyether chain is improved and the amount of fluorine in the molecule is increased, so that the lubricity and the fingerprint removal property are improved even further. Meanwhile, when the molecular weight of the fluoro-polyether chain is 20,000 or smaller, the surface layer has a more excellent friction resistance.

The fluoro-polyether chain preferably has Structure (f1).

(f1)

$R^f$ is a fluoro-alkylene group having a carbon number of 1-6. There are a plurality of fluoro-alkylene groups $R^f$, and they may be identical to each other or at least one of them is different from the others.

y is an integer of 2 or greater, and is preferably 2-200.

$(OR^f)_y$ preferably has a structure represented by the below-shown Formula (f2).

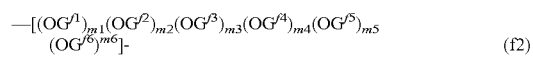

(f2)

where $G^{f1}$ is a fluoro-alkylene group having a carbon number of 1;

$G^{f2}$ is a fluoro-alkylene group having a carbon number of 2;

$G^{f3}$ is a fluoro-alkylene group having a carbon number of 3;

$G^{f4}$ is a fluoro-alkylene group having a carbon number of 4;

$G^{f5}$ is a fluoro-alkylene group having a carbon number of 5;

$G^{f6}$ is a fluoro-alkylene group having a carbon number of 6;

m1, m2, m3, m4, m5 and m6 are independent of each other, and each of them represents an integer of 0 or greater;

m1+m2+m3+m4+m5+m6 is preferably an integer of 2-200.

Note that the bonding order of $(OG^{f1})$ to $(OG^{f6})$ in Formula (f2) is arbitrary. In Formula (f2), m1 to m6 represent the numbers of $(OG^{f1})$ to $(OG^{f6})$, respectively, and do not represent the arrangement thereof. For example, $(OG^{f5})_{m5}$ indicates that the number of $(OG^{f5})$ is m5, and does not represent the block arrangement structure of $(OG^{f5})_{m5}$. Similarly, the order of $(OG^{f1})$ to $(OG^{f6})$ in the description does not represent the bonding order of these units.

Further, each of the above-described fluoro-alkylene groups having carbon numbers 3-6 may be a linear fluoro-alkylene group, a branched fluoro-alkylene group, or a fluoro-alkylene group having a ring-structure.

Specific examples of Gf include —CF$_2$— and —CHF—.

Specific examples of G$^{f2}$ include —CF$_2$CF$_2$—, —CHFCF$_2$—, —CHFCHF—, —CH$_2$CF$_2$—, and —CH$_2$CHF—.

Specific examples of G$^{f3}$ include —CF$_2$CF$_2$CF$_2$—, —CF$_2$CHFCF$_2$—, —CF$_2$CH$_2$CF$_2$—, —CHFCF$_2$CF$_2$—, —CHFCHFCF$_2$—, —CHFCHFCHF—, —CHFCH$_2$CF$_2$—, —CH$_2$CF$_2$CF$_2$—, —CH$_2$CHFCF$_2$—, —CH$_2$CH$_2$CF$_2$—, —CH$_2$CF$_2$CHF—, —CH$_2$CHFCHF—, —CH$_2$CH$_2$CHF—, —CF(CF$_3$)—CF$_2$—, —CF(CHF$_2$)—CF$_2$—, —CF(CH$_2$F)—CF$_2$—, —CF(CH$_3$)—CF$_2$—, —CF(CF$_3$)—CHF—, —CF(CHF$_2$)—CHF—, —CF(CH$_2$F)—CHF—, —CF(CH$_3$)—CHF—, —CF(CF$_3$)—CH$_2$—, —CF(CHF$_2$)—CH$_2$—, —CF(CH$_2$F)—CH$_2$—, —CF(CH$_3$)—CH$_2$—, —CH(CF$_3$)—CF$_2$—, —CH(CHF$_2$)—CF$_2$—, —CH(CH$_2$F)—CF$_2$—, —CH(CH$_3$)—CF$_2$—, —CH(CF$_3$)—CHF—, —CH(CHF$_2$)—CHF—, —CH(CH$_2$F)—CHF—, —CH(CH$_3$)—CHF—, —CH(CF$_3$)—CH$_2$—, —CH(CHF$_2$)—CH$_2$—, and —CH(CH$_2$F)—CH$_2$—. Specific examples of G$^{f4}$ include —CF$_2$CF$_2$CF$_2$CF$_2$—, —CHFCF$_2$CF$_2$CF$_2$—, —CH$_2$CF$_2$CF$_2$CF$_2$—, —CF$_2$CHFCF$_2$CF$_2$—, —CHFCHFCF$_2$CF$_2$—, —CH$_2$CHFCF$_2$CF$_2$—, —CF$_2$CH$_2$CF$_2$CF$_2$—, —CHFCH$_2$CF$_2$CF$_2$—, —CH$_2$CH$_2$CF$_2$CF$_2$—, —CHFCF$_2$CHFCF$_2$—, —CH$_2$CF$_2$CHFCF$_2$—, —CF$_2$CHFCHFCF$_2$—, —CHFCHFCHFCF$_2$—, —CH$_2$CHFCHFCF$_2$—, —CF$_2$CH$_2$CHFCF$_2$—, —CHFCH$_2$CHFCF$_2$—, —CH$_2$CH$_2$CHFCF$_2$—, —CF$_2$CH$_2$CH$_2$CF$_2$—, —CHFCH$_2$CH$_2$CF$_2$—, —CH$_2$CH$_2$CH$_2$CF$_2$—, —CHFCH$_2$CH$_2$CHF—, —CH$_2$CH$_2$CH$_2$CHF—, and -cycloC$_4$F$_6$—.

Specific examples of G$^{f5}$ include —CF$_2$CF$_2$CF$_2$CF$_2$CF$_2$—, —CHFCF$_2$CF$_2$CF$_2$CF$_2$—, —CH$_2$CHFCF$_2$CF$_2$CF$_2$—, —CF$_2$CHFCF$_2$CF$_2$CF$_2$—, —CHFCHFCF$_2$CF$_2$CF$_2$—, —CF$_2$CH$_2$CF$_2$CF$_2$CF$_2$—, —CHFCH$_2$CF$_2$CF$_2$CF$_2$—, —CH$_2$CH$_2$CF$_2$CF$_2$CF$_2$—, —CF$_2$CF$_2$CHFCF$_2$CF$_2$—, —CHFCF$_2$CHFCF$_2$CF$_2$—, —CH$_2$CF$_2$CHFCF$_2$CF$_2$—, —CH$_2$CF$_2$CF$_2$CF$_2$CH$_2$—, and -cycloC$_5$F$_8$—.

Specific examples of G$^{f6}$ include —CF$_2$CF$_2$CF$_2$CF$_2$CF$_2$CF$_2$—, —CF$_2$CF$_2$CHFCHFCF$_2$CF$_2$—, —CHFCF$_2$CF$_2$CF$_2$CF$_2$CF$_2$—, —CHFCHFCHFCHFCHF—, —CHFCF$_2$CF$_2$CF$_2$CF$_2$CH$_2$—, —CH$_2$CF$_2$CF$_2$CF$_2$CF$_2$CH$_2$—, and -cycloC$_6$F$_{10}$—.

Note that -cycloC$_4$F$_6$— refers to a perfluoro-cyclobutanediyl group, and its specific examples include a perfluoro-cyclobutane-1,2-diyl group and a perfluoro-cyclobutane-1,3-diyl group. -cycloC$_5$F$_8$— refers to a perfluoro-cyclopentanediyl group, and its specific examples include a perfluoro-cyclopentane-1,3-diyl group. -cycloC$_6$F$_{10}$ refers to a perfluoro-cyclohexanediyl group, and its specific examples include a perfluoro-cyclohexane-1,4-diyl group.

To achieve more excellent water and oil repellency, a friction resistance, and a fingerprint stain removal property, (OR$^f$)$_y$ preferably has, in particular, one of structures represented by the below-shown Formulas (f3) to (f5). Further, to achieve a more excellent alkali resistance, (OR$^f$)$_y$ more preferably has a structure represented by the below-shown Formula (f3), and still more preferably has a structure expressed as (OCF$_2$)$_{m1}$—(OCF$_2$CF$_2$)$_{m2}$.

$(OG^{f1})_{m1}\text{-}(OG^{f2})_{m2}$ (f3)

$(OG^{f2})_{m2}\text{-}(OG^{f4})_{m4}$ (f4)

$(OG^{f3})_{m3}$ (f5)

Note that symbols in Formulas (f3) to (f5) are similar to those in the above-show Formula (f2).

In Formulas (f3) and (f4), the bonding order of (OG$^{f1}$) and (OG$^{f2}$), and that of (OG$^{f2}$) and (OG$^{f4}$) are arbitrary. For example, in Formula (G2), (OG$^{f1}$) and (OG$^{f2}$) may be alternately arranged, and (OG$^{f1}$) and (OG$^{f2}$) may be arranged in each block or randomly arranged. The same applies to Formula (f5).

In Formula (f3), m1 is preferably 1-30 and more preferably 1-20. Further, m2 is preferably 1-30 and more preferably 1-20.

In Formula (f4), m2 is preferably 1-30 and more preferably 1-20. Further, m4 is preferably 1-30 and more preferably 1-20.

In Formula (f5), m3 is preferably 1-30 and more preferably 1-20.

To achieve more excellent water and oil repellency and a fingerprint removal property, the ratio of fluorine atoms in the fluoro-polyether chain (OR$^f$)$_y$, i.e., the ratio [{Number of fluorine atoms/(Number of fluorine atoms+number of hydrogen atoms)}×100 (%)], is preferably 60% or higher, more preferably 70% or higher, and still more preferably 80% or higher.

Further, in view of the friction resistance, the molecular weight of the (OR$^f$)$_y$ part of the fluoro-polyether chain is preferably 2,000-20,000, more preferably 2,500-15,000, and still more preferably 3,000-10,000.

The reactive silyl group is preferably a group (g1).

—SiR$^{a1}_{z1}$R$^{a2}_{3-z1}$ (g1)

where

R$^{a1}$ is a hydroxyl group or a hydrolytic group, and when there are a plurality of R$^{a1}$, the plurality of R$^{a1}$ may be identical to each other or at least one of them is different from the others;

R$^{a2}$ is a non-hydrolytic group, and when there are a plurality of R$^{a2}$, the plurality of R$^{a2}$ may be identical to each other or at least one of them is different from the others; and z1 is an integer of 1-3.

When R$^{a1}$ is a hydroxyl group, it constitutes a silanol (Si—OH) group together with an Si atom. Further, the hydrolytic group is a group that becomes a hydroxyl group (i.e., a silanol group) through a hydrolysis reaction. The silanol group further forms a Si—O—Si bond through an intermolecular reaction. Further, the silanol group forms a chemical bond (substrate (or underlayer)-O—Si) through a dehydration condensation reaction with a hydroxyl group (substrate (or underlayer)-OH) present on the surface of the substrate (or underlayer). Since the fluorine-containing ether compound has at least one group (g1), it has an excellent friction resistance after the surface layer is formed.

Examples of hydrolytic groups of R$^{a1}$ include an alkoxy group, an aryloxy group, a halogen atom, an acyl group, an acyloxy group, and an isocyanate group (—NCO). As the alkoxy group, an alkoxy group having a carbon number of 1-4 is preferred. As the acyl group, an acyl group having a carbon number of 1-6 is preferred. As the acyloxy group, an acyloxy group having a carbon number of 1-6 is preferred.

For the ease of the manufacturing of a fluorine-containing ether compound, R$^{a1}$ is preferably, in particular, an alkoxy group having a carbon number of 1-4 or a halogen atom. To improve the storage stability of the fluorine-containing ether compound and to prevent gas from being emitted outside during the reaction, the alkoxy group in R$^{a1}$ is preferably, in particular, an alkoxy group having a carbon number of 1-4. Further, in view of the storage stability over a long time, the alkoxy group in $R^{a1}$ is, preferably, an ethoxy group, and to reduce the hydrolysis reaction time, the alkoxy group in $R^{a1}$ is preferably a methoxy group. As the halogen atom, in particular, a chlorine atom is preferred.

Examples of the non-hydrolytic group of $R^{a2}$ include a hydrogen atom and a monovalent hydrocarbon group and the like. Examples of the hydrocarbon group include an alkyl group, a cycloalkyl group, an alkenyl group, and an allyl group. Further, for the ease of the manufacturing or the like, an alkyl group is preferred. Further, for the ease of the manufacturing or the like, the carbon number of the hydrocarbon group is preferably 1-6, more preferably 1-3, and still more preferably 1-2.

z1 may be an integer of 1-3. In view of the adhesion to the substrate (or underlayer), z1 is preferably 2 or 3, and more preferably 3.

Specific examples of the group (g1) include —$Si(OCH_3)_3$, —$SiCH_3(OCH_3)_2$, —$Si(OCH_2CH_3)_3$, —$SiCl_3$, —$Si(OCOCH_3)_3$, and —$Si(NCO)_3$.

For the ease of the handling in the manufacturing, the group (g1) is preferably —$Si(OCH_3)_3$.

Note that when there are a plurality of groups (g1) in one molecule, the plurality of groups (g1) may be identical to each other or at least one of them is different from the others.

In the fluorine-containing ether compound, the above-described fluoro-polyether chain and the above-described group (g1) are bonded to each other directly or through a linking group. Examples of the linking group include an organic group having a valency of 2 or higher.

The number of fluoro-polyether chains in one molecule in the fluorine-containing ether compound may be one, or may be two or more. For the ease of synthesis or the like, the number of fluoro-polyether chains in one molecule is preferably 1-20, more preferably 1-10, and still more preferably 1-4.

Further, the number of groups (g1) in one molecule of the fluorine-containing ether compound may be one, or may be two or more. To improve both the friction resistance and the water and oil repellency or the like, the number of groups (g1) is preferably 1-32, more preferably 1-18, and still more preferably 2-12.

Note that when there are a plurality of fluoro-polyether chains, the plurality of fluoro-polyether chains may be identical to each other or at least one of them is different from the others. Further, when there are a plurality of groups (g1), the plurality of groups (g1) may be identical to each other or at least one of them is different from the others.

The fluorine-containing ether compound may be any fluorine-containing ether compound that meets the above-described structure.

For the ease of synthesis, the ease of handling of compounds, and the like, the fluorine-containing ether compound is preferably a compound represented by the below-shown Formula (A1), (A2) or (A3).

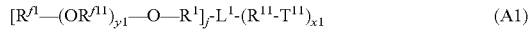

$$[R^{f1}—(OR^{f11})_{y1}—O—R^1]_j\text{-}L^1\text{-}(R^{11}\text{-}T^{11})_{x1} \tag{A1}$$

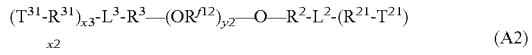

$$(T^{31}\text{-}R^{31})_{x3}\text{-}L^3\text{-}R^3—(OR^{f12})_{y2}—O—R^2\text{-}L^2\text{-}(R^{21}\text{-}T^{21})_{x2} \tag{A2}$$

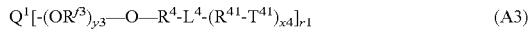

$$Q^1[\text{-}(OR^{f3})_{y3}—O—R^4\text{-}L^4\text{-}(R^{41}\text{-}T^{41})_{x4}]_{r1} \tag{A3}$$

where
$R^{f1}$ is a fluoro-alkyl group having a carbon number of 1-20, and when there are a plurality of $R^{f1}$, the plurality of $R^{f1}$ may be identical to each other or at least one of them is different from the others;

$R^{f11}$ is a fluoro-alkylene group having a carbon number of 1-6, and when there are a plurality of $R^{f11}$, the plurality of $R^{f11}$ may be identical to each other or at least one of them is different from the others;

$R^1$ is an alkylene group or a fluoro-alkylene group, and when there are a plurality of $R^1$, the plurality of $R^1$ may be identical to each other or at least one of them is different from the others;

$L^1$ is a single bond, or an organic group having a valency of j+x1 which may have N, O, S, Si and may have a branch point. Atoms bonded to $R^1$ and $R^{11}$ are independent of each other, and each of them is N, O, S, Si, a carbon atom constituting a branch point, or a carbon atom having an oxo group (=O);

$R^{11}$ is an alkylene group in which an atom bonded to $L^1$ may be an ethereal oxygen atom or an alkylene group which may have an ethereal oxygen atom between carbon-carbon atoms;

$T^{11}$ is —$SiR^{a11}_{z11}R^{a12}_{3-z11}$;

$R^{a11}$ is a hydroxyl group or a hydrolytic group, and when there are a plurality of $R^{a11}$, the plurality of $R^{a11}$ may be identical to each other or at least one of them is different from the others;

$R^{a12}$ is a non-hydrolytic group, and when there are a plurality of $R^{a12}$, the plurality of $R^{a12}$ may be identical to each other or at least one of them is different from the others;

j is an integer of 1 or greater;
z11 is an integer of 1-3;
x1 is an integer of 1 or greater;
y1 is an integer of 1 or greater, and when there are a plurality of y1, the plurality of y1 may be identical to each other or at least one of them is different from the others;

$R^{f12}$ is a fluoro-alkylene group having a carbon number of 1-6, and when there are a plurality of $R^{f12}$, the plurality of $R^{f12}$ may be identical to each other or at least one of them is different from the others;

$R^2$ and $R^3$ are independent of each other, and each of them is an alkylene group or a fluoro-alkylene group;

$L^2$ is a single bond, or an organic group having a valency of 1+x2 which may have N, O, S, Si and may have a branch point. Atoms bonded to $R^2$ and $R^{21}$ are independent of each other, and each of them is N, O, S, Si, a carbon atom constituting branch point, or a carbon atom having an oxo group (=O);

$R^{21}$ is an alkylene group in which an atom adjacent to $L^2$ may be an ethereal oxygen atom or an alkylene group which may have an ethereal oxygen atom between carbon-carbon atoms;

$L^3$ is a single bond, or an organic group having a valency of 1+x3 which may have N, O, S, Si and may have a branch point. Atoms bonded to $R^3$ and $R^{31}$ are independent of each other, and each of them is N, O, S, Si, a carbon atom constituting branch point, or a carbon atom having an oxo group (=O);

$R^{31}$ is an alkylene group in which an atom adjacent to $L^3$ may be an ethereal oxygen atom or an alkylene group which may have an ethereal oxygen atom between carbon-carbon atoms;

$T^{21}$ and $T^{31}$ are independent of each other, and each of them is —$SiR^{a2}_{z21}R^{a22}_{3-z21}$;

$R^{a21}$ is a hydroxyl group or a hydrolytic group, and when there are a plurality of $R^{a21}$, the plurality of $R^{a21}$ may be identical to each other or at least one of them is different from the others;

$R^{a22}$ is a non-hydrolytic group, and when there are a plurality of $R^{a22}$, the plurality of $R^{a22}$ may be identical to each other or at least one of them is different from the others;

z21 is an integer of 1-3;

x2 and x3 are independent of each other, and each of them is an integer of 1 or greater;

y2 is an integer of 1 or greater;

$Q^1$ is a group having a valency of r1 and having a branch point;

$R^{f13}$ is a fluoro-alkylene group having a carbon number of 1-6, and when there are a plurality of $R^{f13}$, the plurality of $R^{f13}$ may be identical to each other or at least one of them is different from the others;

$R^4$ is independent of each other, and each of them is an alkylene group or a fluoro-alkylene group;

$L^4$ is a single bond, or an organic group having a valency of 1+x4 which may have N, O, S, Si and may have a branch point. Atoms bonded to $R^4$ and $R^{41}$ are independent of each other, and each of them is N, O, S, Si, a carbon atom constituting branch point, or a carbon atom having an oxo group (=O);

$R^{41}$ is an alkylene group in which an atom adjacent to $L^4$ may be an ethereal oxygen atom or an alkylene group which may have an ethereal oxygen atom between carbon-carbon atoms;

$T^{41}$ is $-SiR^{a41}{}_{z41}R^{a42}{}_{3-z41}$;

$R^{a41}$ is a hydroxyl group or a hydrolytic group, and when there are a plurality of $R^{a41}$, the plurality of $R^{a41}$ may be identical to each other or at least one of them is different from the others;

$R^{a42}$ is a non-hydrolytic group, and when there are a plurality of $R^{a42}$, the plurality of $R^{a42}$ may be identical to each other or at least one of them is different from the others;

z41 is an integer of 1-3;

x4 is an integer of 1 or greater;

y3 is an integer of 1 or greater; and r1 is 3 or 4.

The structure of each of compounds will be described hereinafter. Symbols assigned to similar structures indicate similar structures, and they may be referred to each other as appropriate.

(Compound (A1))

Compound (A1) has a structure represented by the below-shown Formula (A1).

$$[R^{f1}-(OR^{f11})_{y1}-O-R^1]_j-L^1-(R^{11}-T^{11})_{x1} \quad (A1)$$

Note that the symbols in Formula (A1) are as described above.

$R^{f1}$ is a fluoro-alkyl group having a carbon number of 1-20. This fluoro-alkyl group may be linear and may have a branch and/or a ring structure. In view of the friction resistance, the fluoro-alkyl group is preferably a linear fluoro-alkyl group. Further, for the ease of synthesis or the like, the carbon number of the fluoro-alkyl group is preferably 1-6 and more preferably 1-3.

$R^{f11}$ and y1 of $(OR^{f11})_{y1}$ are similar to $R^f$ and y in the above-shown Formula (f1), respectively, and their preferred aspects are also similar.

$R^1$ is an alkylene group or a fluoro-alkylene group. The alkylene group and the fluoro-alkylene group in $R^1$ may be linear and may have a branch and/or a ring structure. For the ease of synthesis or the like, it is preferably a linear or branched alkylene group or a fluoro-alkylene group, and more preferably an alkylene group or a fluoro-alkylene group having a methyl group or a fluoro-methyl group as a linear chain or a branch. The carbon number of $R^1$ is preferably 1-6 and more preferably 1-3. Note that when $L^1$ is a single bond, $R^1$ bonds to $R^{11}$. In this case, it is assumed that the carbon atom bonded to $R^{11}$ in $R^1$ is bonded to at least one fluorine atom or a fluoro-alkyl group.

j represents the number of $[R^{f1}-(OR^{f11})_{y1}-O-R^1]$ in one molecule, and may be an integer of 1 or greater, preferably 1-20, more preferably 1-10, and still more preferably 1-4.

$R^{11}$ is an alkylene group in which an atom bonded to $L^1$ may be an ethereal oxygen atom or an alkylene group which may have an ethereal oxygen atom between carbon-carbon atoms.

The alkylene group in $R^{11}$ may be linear and may have a branch and/or a ring structure. Based on the fact that Compound (A1) is more likely to be densely disposed when the surface layer is formed, it is preferably an alkylene group having a methyl group as a linear chain or a branch, and more preferably a linear alkylene group.

Specifically, $R^{11}$ can be expressed by the below-shown Formula (g2).

$$*-(O)_{a1}-(R^{g2}O)_{a2}-R^{g2}-** \quad (g2)$$

where $R^{g2}$ is an alkylene group having a carbon number of 1 or greater; there are a plurality of $R^{g2}$, and they may be identical to each other or at least one of them is different from the others;

a1 is 0 or 1;

a2 is an integer of 0 or greater;

* is a bonding hand that bonds to Li; and

** is a bonding hand that bonds to $T^{11}$.

When a1 is 0, the atom having the bonding hand * is a carbon atom, whereas when a1 is 1, the atom having the bonding hand * is an oxygen atom. In Compound (A1), a1 can be either 0 or 1, and may be selected as appropriate in view of synthesis or the like.

a2 is the number of repetitions of $R^{g2}O$, and in view of the durability or the like as the surface layer, is preferably 0-6, more preferable 0-3, and still more preferably 0-1.

To achieve, as the surface layer, more excellent water and oil repellency and a fingerprint stain removal property and to achieve excellent durability such as a friction resistance, $R^{11}$ is more preferably a group represented by the below-shown Formula (g3).

$$*-(O)_{a1}-R^{g3}-** \quad (g3)$$

where $R^{g3}$ is an alkylene group;

a1, *, and ** are similar to those in Formula (g2).

The alkylene group in $R^{g3}$ may be linear and may have a branch and/or a ring structure. Based on the fact that Compound (A1) is more likely to be densely disposed when the surface layer is formed, it is preferably a linear alkylene group. Further, the carbon number of $R^{g3}$ may be one or greater, preferably 1-18, more preferably 1-12, and still more preferably 1-6.

$T^{11}$ is $-SiR^{a11}{}_{z11}R^{a12}{}_{3-z11}$, and $R^{a11}$, $R^{a12}$, and z11 are similar to $R^{a1}$, $R^{a2}$, and z1, respectively, constituting the above-described group (g1). Further, their preferred aspects are also similar.

x1 represents the number of $R^{11}$-$T^{11}$ in one molecule, and may be an integer of 1 or greater, preferably 1-32, more preferably 1-18, and still more preferably 2-12.

$L^1$ is a single bond, or a group having a valency of j+x1 which may have N, O, S, Si and may have a branch point. Atoms bonded to $R^1$ and $R^{11}$ are independent of each other, and each of them is N, O, S, Si, a carbon atom constituting a branch point, or a carbon atom having an oxo group (=O). Note that the atoms bonded to $R^1$ and $R^{11}$ may be the atoms of the same element or those of different elements.

When $L^1$ is a single bond, $R^1$ and $R^{11}$ in Formula (A1) are directly bonded to each other, and Compound (A1) is represented by the below-shown Formula (A1').

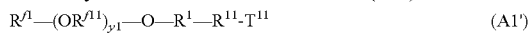 (A1')

Note that the symbols in Formula (A1') are similar to those in Formula (A1).

When $L^1$ is a group having a valency of 3 or higher, $L^1$ has at least one branch point (hereinafter also referred to as a "branch point $P^1$") selected from the group consisting of C, N, Si, a ring structure, and an organo-polysiloxane residue having a valency of (j+x1).

When N is the branch point $P^1$, the branch point $P^1$ is expressed, for example, as *—N(—**)$_2$ or (*—)$_2$N—**. Note that * is the bonding hand on the $R^1$ side, and ** is the bonding hand on the $R^{11}$ side.

When C is the branch point $P^1$, the branch point $P^1$ is expressed, for example, as *—C(—**)$_3$, (*—)$_2$C(—**)$_2$, (*—)$_3$C—**, *—CR$^{29}$(—**)$_2$, or (*—)$_2$CR$^{29}$—**. Note that * is a bonding hand on the $R^1$ side, and ** is a bonding hand on the $R^{11}$ side. Further, $R^{29}$ is a monovalent group, and its examples include a hydrogen atom, a hydroxyl group, an alkyl group, and an alkoxy group.

When Si is the branch point $P^1$, the branch point $P^1$ is expressed, for example, as *—Si(—**)$_3$, (*—)$_2$Si(—**)$_2$, (*—)$_3$Si—**, *—SiR$^{29}$(—**)$_2$, or (*—)$_2$SiR$^{29}$—**. Note that * is a bonding hand on the $R^1$ side, and ** is a bonding hand on the $R^{11}$ side. Further, $R^{29}$ is a monovalent group, and its examples include a hydrogen atom, a hydroxyl group, an alkyl group, and an alkoxy group.

For the ease of the manufacturing of a fluorine-containing ether compound and to achieve a more excellent friction resistance, light stability, and a chemical resistance of the surface layer, the ring structure constituting the branch point $P^1$ is preferably one selected from the group consisting of a 3-8 membered aliphatic ring, a 3-8 membered aromatic ring, a 3-8 membered hetero ring, and a fused ring consisting of two or more of these rings, and more preferably a ring structure listed in the below-shown formulas. The ring structure may have a substituent such as a halogen atom, an alkyl group (which may include an ethereal oxygen atom between carbon-carbon atoms), a cycloalkyl group, an alkenyl group, an allyl group, an alkoxy group, and an oxo group (=O).

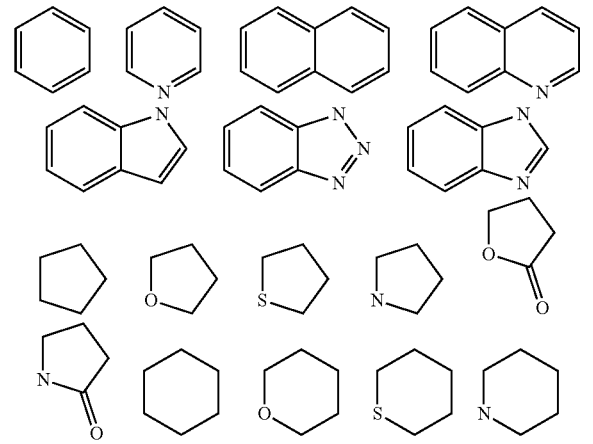

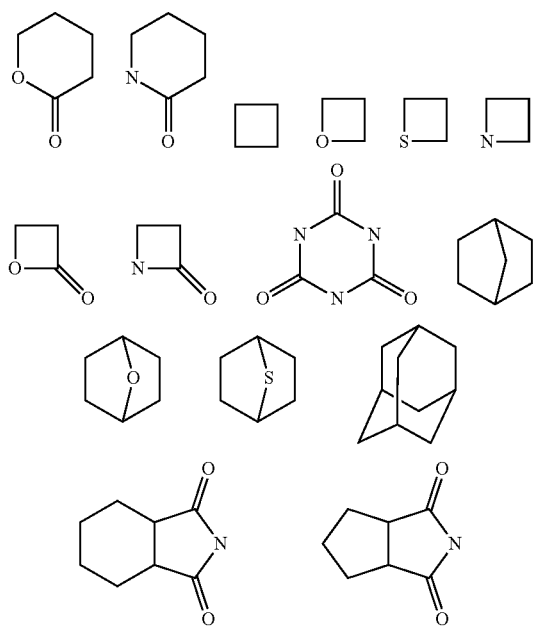

Examples of the organo-polysiloxane residue constituting the branch point $P^1$ include the below-shown groups. Note that $R^{25}$ in the below-shown formulas is a hydrogen atom, an alkyl group, an alkoxy group, or a phenyl group. The carbon number of each of the alkyl group and the alkoxy group of $R^{25}$ is preferably 1-10 and more preferably 1.

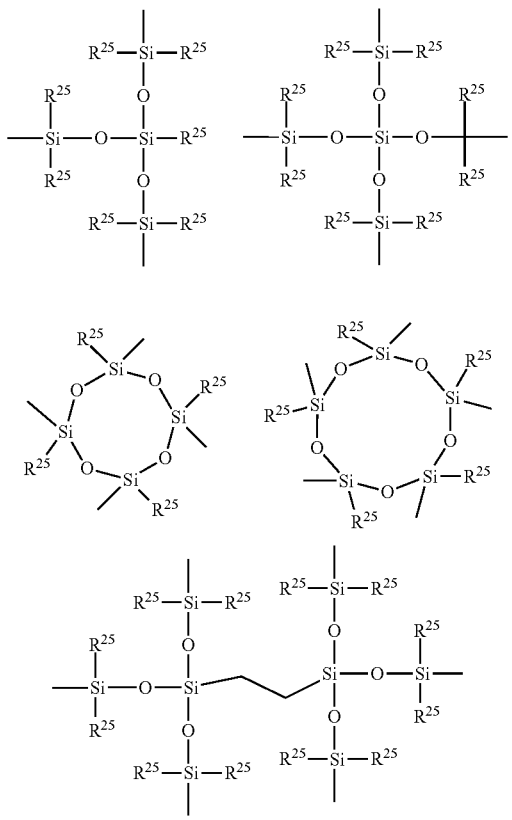

-continued

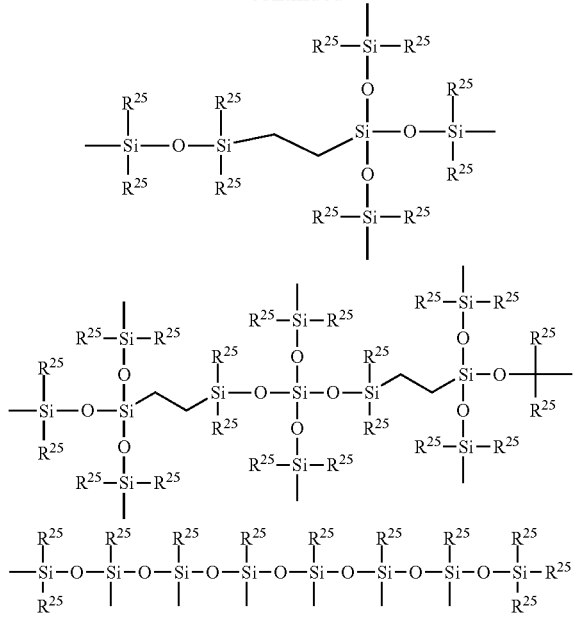

L having a valency of 2 or higher may have at least one bond (hereinafter also referred to as a "bond $B^{1}$") selected from the group consisting of —C(O)N($R^{26}$)—, —N($R^{26}$)C(O)—, —C(O)O—, —OC(O)—, —C(O)—, —O—, —N($R^{26}$)—, —S—, —OC(O)O—, —NHC(O)O—, —OC(O)NH—, —NHC(O)N($R^{26}$)—, —SO$_2$N($R^{26}$)—, —N($R^{26}$)SO$_2$—, —Si($R^{26}$)$_2$—, —OSi($R^{26}$)$_2$—, —Si(CH$_3$)$_2$-Ph-Si(CH$_3$)$_2$—, and a divalent organo-polysiloxane residue.

Note that $R^{26}$ is a hydrogen atom, or an alkyl group or a phenyl group having a carbon number of 1-6, and Ph is a phenylene group. For the ease of the manufacturing of a fluorine-containing ether compound, the carbon number of the alkyl group of $R^{26}$ is preferably 1-6, more preferably 1-3, and still more preferably 1-2.

The divalent organo-polysiloxane residue is, for example, a group represented by the below-shown formula. Note that $R^{27}$ in the below-shown formula is a hydrogen atom, an alkyl group, an alkoxy group, or a phenyl group. The carbon number of each of the alkyl group and the alkoxy group of $R^{27}$ is preferably 1-10 and more preferably 1.

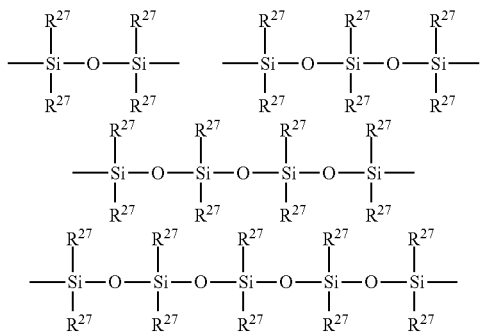

For the ease of the manufacturing of a fluorine-containing ether compound, the bond $B^{1}$ is preferably at least one bond selected from the group consisting of —C(O)N$R^{26}$—, —N($R^{26}$)C(O)—, —C(O)—, and —N$R^{26}$—, and to achieve more excellent light stability and a chemical resistance of the surface layer, more preferably —C(O)N$R^{26}$—, —N($R^{26}$)C(O)—, or —C(O)—.

As the divalent $L^{1}$, the atoms bonded to $R^{1}$ and $R^{11}$ are independent of each other, and each of them is N, O, S, Si, or a carbon atom having an oxo group (=O). That is, each of the atoms adjacent to $R^{1}$ and $R^{11}$ is a constituent element of the bond $B^{1}$. Specific examples of the divalent $L^{1}$ include a single bond and at least one bond $B^{1}$ (e.g., *—$B^{1}$—** and *—$B^{1}$—$R^{28}$—$B^{1}$—**). Note that $R^{28}$ is a single bond or a divalent organic group. Further, * is a bonding hand on the $R^{1}$ side, and ** is a bonding hand on the $R^{11}$ side.

Regarding $L^{1}$ having a valency of 3 or higher, the atoms bonded to $R^{1}$ and $R^{11}$ are independent of each other, and each of them is N, O, S, Si, a carbon atom constituting a branch point, or a carbon atom having an oxo group (=O). That is, each of atoms adjacent to $R^{1}$ and $R^{11}$ is a constituent element of the bond $B^{1}$ or the branch point $P^{1}$.

Specific examples of $L^{1}$ having a valency of 3 or higher include at least one branch point $P^{1}$ (e.g., $\{(*—)_j P^{1}(—**)_{x1}\}$ or $\{(*—)_j P^{1}—R^{28}—P^{1}(—**)_{x1}\}$) and a combination of at least one branch point $P^{1}$ and at least one bond $B^{1}$ (e.g., $\{*—B^{1}—R^{28}—P^{1}(—**)_{x1}\}$ or $\{*—B^{1}—R^{28}—P^{1}(—R^{28}—B^{1}—**)_{x1}\}$). Note that $R^{28}$ is a single bond or a divalent organic group. Further, * is a bonding hand on the $R^{1}$ side, and ** is a bonding hand on the $R^{11}$ side.

Examples of the divalent organic group in the above-described $R^{28}$ include hydrocarbon groups such as a divalent aliphatic hydrocarbon group (such as an alkylene group and a cycloalkylene group), a divalent aromatic hydrocarbon group (such as a phenylene group). Further, the divalent organic group may have a bond $B^{1}$ between carbon-carbon atoms of the hydrocarbon group. The carbon number of the divalent organic group is preferably 1-10, more preferably 1-6, and still more preferably 1-4.

For the ease of the manufacturing of a fluorine-containing ether compound, the above-described $L^{1}$ is preferably a group represented by one of the below-shown Formulas (L1) to (L7).

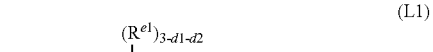
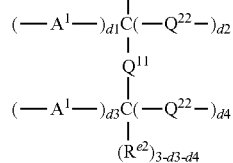

 (L2)

 (L3)

 (L4)

 (L5)

 (L6)

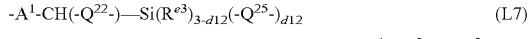 (L7)

Note that in Formulas (L1) to (L7), the $A^{1}$, $A^{2}$ or $A^{3}$ side is connected to $R^{1}$ of Formula ($A^{1}$), and the $Q^{22}$, $Q^{23}$, $Q^{24}$, $Q^{25}$ or $Q^{26}$ side is connected to $R^{11}$.

Note that $A^1$ is a single bond, —$B^3$—, —$B^3$—$R^{30}$—, or —$B^3$—$R^{30}$—$B^2$—; $R^{30}$ is an alkylene group or a group having —C(O)$NR^{e6}$—, —C(O)—, —$NR^{e6}$—, or —O— between carbon-carbon atoms of an alkylene group having a carbon number of 2 or greater; $B^2$ is —C(O)$NR^{e6}$—, —C(O)—, —$NR^{e6}$—, or —O—; and $B^3$ is —C(O)$NR^{e6}$—, —C(O)—, or —$NR^{e6}$—;

$A^2$ is a single bond or —$B^3$—$R^{30}$—;

$A^3$ is $A^1$ when the atom in $Z^1$ to which $A^3$ is bonded is a carbon atom, and is $A^2$ when the atom in $Z^1$ to which $A^3$ is bonded is a nitrogen atom;

$Q^{11}$ is a single bond, —O—, an alkylene group, or a group having —C(O)$NR^{e6}$—, —C(O)—, —$NR^{e6}$—, or —O— between carbon-carbon atoms of an alkylene group having a carbon number of 2 or greater;

$Q^{22}$ is a single bond, —$B^3$—, —$R^{30}$—$B^3$— or —$B^2$—$R^{30}$—$B^3$—;

$Q^{23}$ is a single bond or —$R^{30}$—$B^3$—;

$Q^{24}$ is $Q^{22}$ when the atom in $Z^1$ to which $Q^{24}$ is bonded is a carbon atom, and is $Q^{23}$ when the atom in $Z^1$ to which $Q^{24}$ is bonded is a nitrogen atom;

$Q^{25}$ is a single bond, or —$R^{30}$—$B^3$—;

$Q^{26}$ is a single bond or —$R^{30}$—$B^3$—;

$Z^1$ is a group having a ring structure having a valency of (d8+d9), and having a carbon atom or a nitrogen atom to which $A^3$ is directly bonded and a carbon atom or a nitrogen atom to which $Q^{24}$ is directly bonded;

$R^{e1}$ is a hydrogen atom or an alkyl group;

$R^{e2}$ is a hydrogen atom, a hydroxyl group, an alkyl group, or an acyloxy group;

$R^{e3}$ is an alkyl group;

$R^{e6}$ is a hydrogen atom, or a carbon alkyl group or a phenyl group having a carbon number of 1-6;

d1 is an integer of 0-3; d2 is an integer of 0-3; and d1+d2 is an integer of 1-3;

d3 is an integer of 0-3; d4 is an integer of 0-3; and d3+d4 is an integer of 1-3;

d1+d3 is an integer of 1-5;

d2+d4 is an integer of 1-5;

d5 is an integer of 1-3; d6 is an integer of 1-3; d5+d6 is an integer of 2-4;

d7 is 1 or 2;

d8 is an integer of 1 or greater;

d9 is an integer of 1 or greater;

d10 is an integer of 1-3; d11 is an integer of 1-3; d10+d11 is an integer of 2-4; and d12 is an integer of 1-3.

Note that when there are a plurality of $A^1$, the plurality of $A^1$ may be identical to each other or at least one of them is different from the others. The same applies to $A^2$, $A^3$, $Q^{22}$, $Q^{23}$, $Q^{24}$, $Q^{25}$, R, $R^{e2}$ and $R^{e3}$.

Further, each of d1+d3, d5, d7, d8, and d10 is j, and each of d2+d4, d6, 3-d7, d9, d11, and 1+d12 is x1.

For the ease of the manufacturing of a fluorine-containing ether compound and to achieve a more excellent friction resistance, light stability, and a chemical resistance of the surface layer, the carbon number of the alkylene group of $R^{30}$ is preferably 1-10, more preferably 1-6, and still more preferably 1-4. Meanwhile, the lower limit value of the carbon number of the alkylene group in the case where the alkylene group has a specific bond between carbon-carbon atoms is 2.

Examples of the ring structure in $Z^1$ include the above-described ring structure, and its preferred aspects are also similar to those of the above-described ring structure.

For the ease of the manufacturing of a fluorine-containing ether compound, the carbon number of the alkyl group of $R^{e1}$, $R^{e2}$ or $R^{e3}$ is preferably 1-6, more preferably 1-3, and still more preferably 1-2.

For the ease of the manufacturing of Compound 1, the carbon number of the alkyl group part of the acyloxy group of $R^{e2}$ is preferably 1-6, more preferably 1-3, and still more preferably 1-2.

For the ease of the manufacturing of a fluorine-containing ether compound and to achieve a more excellent friction resistance and a fingerprint stain removal property of the surface layer, the carbon number of d9 is preferably 2-6, more preferably 2-4, and still more preferably 2 or 3.

Examples of other forms of the above-described $L^1$ include groups represented by the below-shown Formulas (L11) to (L17).

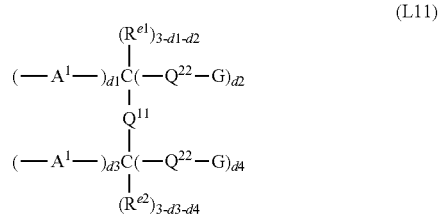

(L11)

(L12)

(L13)

(L14)

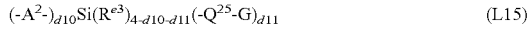

(L15)

(L16)

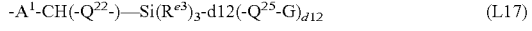

(L17)

Note that in Formulas (L11) to (L17), the $A^1$, $A^2$ or $A^3$ side is connected to $R^1$ of Formula ($A^1$), and the $Q^{22}$, $Q^{23}$, $Q^{24}$, $Q^{25}$ or $Q^{26}$ side is connected to $R^{11}$. G is the below-shown group (G21), and two or more G in $L^1$ may be identical to each other or at least one of them is different from the others. Symbols other than G are similar to those in Formulas (L11) to (L17).

(G21)

Note that in Formula (G21), the Si side is connected to $Q^{22}$, $Q^{23}$, $Q^{24}$, $Q^2$ or $Q^{26}$, and the $Q^3$ side is connected to $R^{11}$. $R^{21}$ is an alkyl group. $Q^3$ is a single bond, or —$R^{31}$—$B^3$—. $R^{31}$ is an alkylene group, or a group having —C(O)$NR^{32}$—, —C(O)—, —$NR^{32}$—, or —O— between carbon-carbon atoms of an alkylene group having a carbon number of two or greater, or is —(OSi($R^{22}$)$_2$)$_{p11}$—O—, in which the two or more $Q^3$ may be identical to each other or at least one of them is different from the others. k is 2 or 3. $R^{32}$ is a hydrogen atom, an alkyl group or a phenyl group having a carbon number of 1-6. $R^{22}$ is an alkyl group, a phenyl group, or an alkoxy group, and the two $R^{22}$ may be identical to each other or at least one of them is different from the others. p11 is an integer of 0-5. When p11 is two or greater, the two or more (OSi($R^{22}$)$_2$) may be identical to each other or at least one of them is different from the others.

For the ease of the manufacturing of a fluorine-containing ether compound and to achieve a more excellent friction resistance, light stability, and a chemical resistance of the surface layer, the carbon number of the alkylene group of $Q^3$ is preferably 1-10, more preferably 1-6, and still more preferably 1-4. Meanwhile, the lower limit value of the carbon number of the alkylene group in the case where the alkylene group has a specific bond between carbon-carbon atoms is two.

For the ease of the manufacturing of a fluorine-containing ether compound, the carbon number of the alkyl group of $R^{21}$ is preferably 1-6, more preferably 1-3, and still more preferably 1-2.

For the ease of the manufacturing of a fluorine-containing ether compound, the carbon number of the alkyl group of $R^{22}$ is preferably 1-6, more preferably 1-3, and still more preferably 1-2.

To improve the storage stability of the fluorine-containing ether compound, the carbon number of the alkoxy group of $R^{22}$ is preferably 1-6, more preferably 1-3, and still more preferably 1-2.

$p^{11}$ is preferably 0 or 1.

Examples of Compound ($A^1$) include those shown below. Note that $R^f$ is $[R^{f1}-(OR^{f11})^{y1}-O-R^1]$.

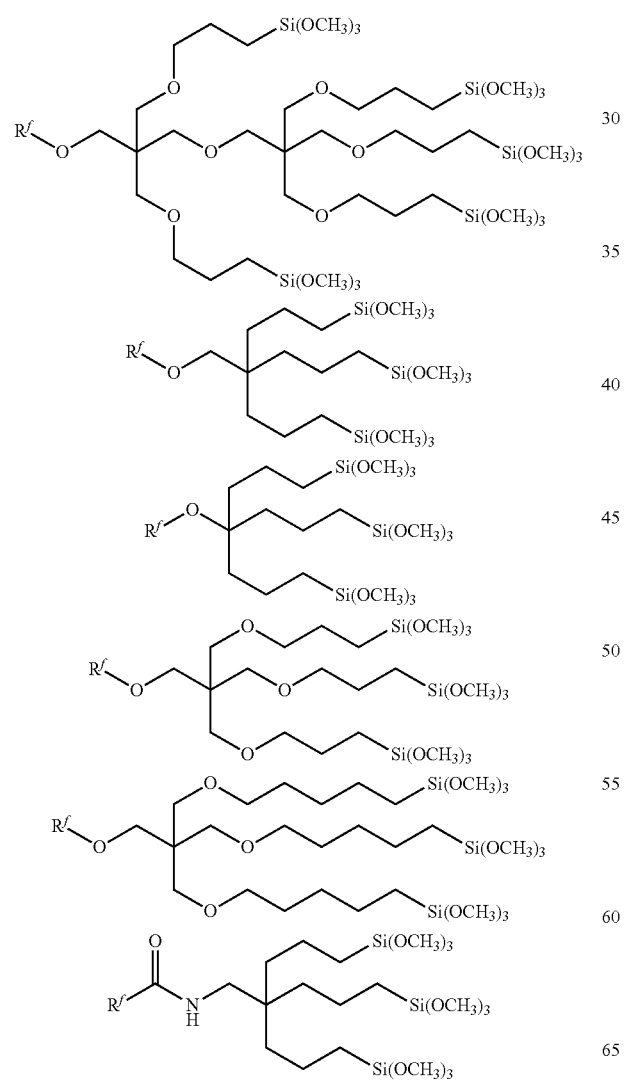
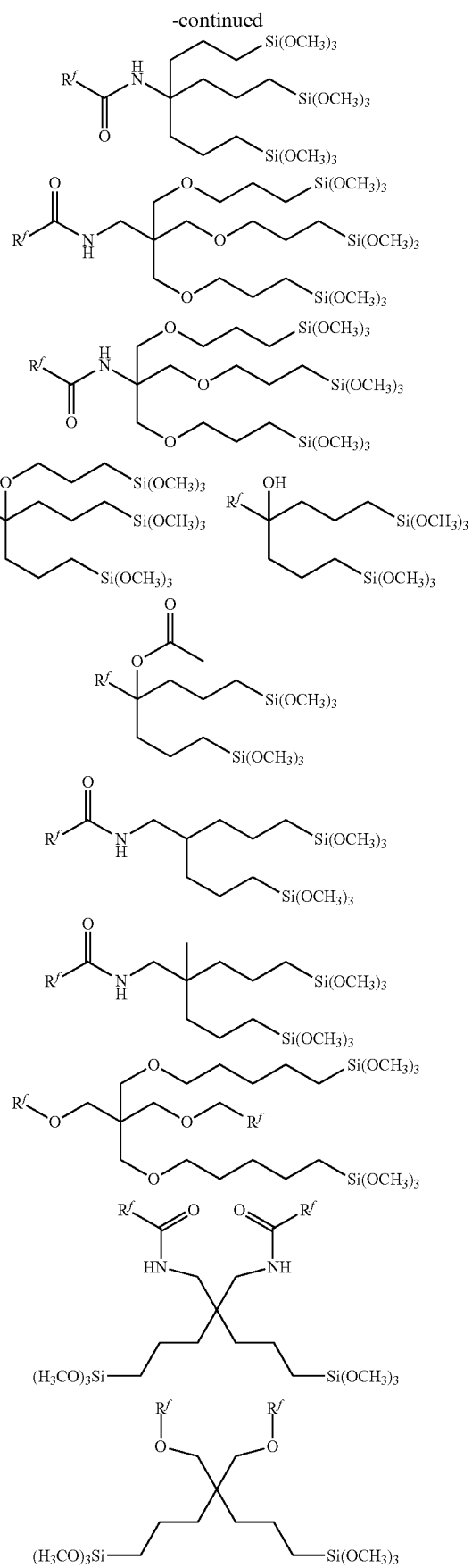

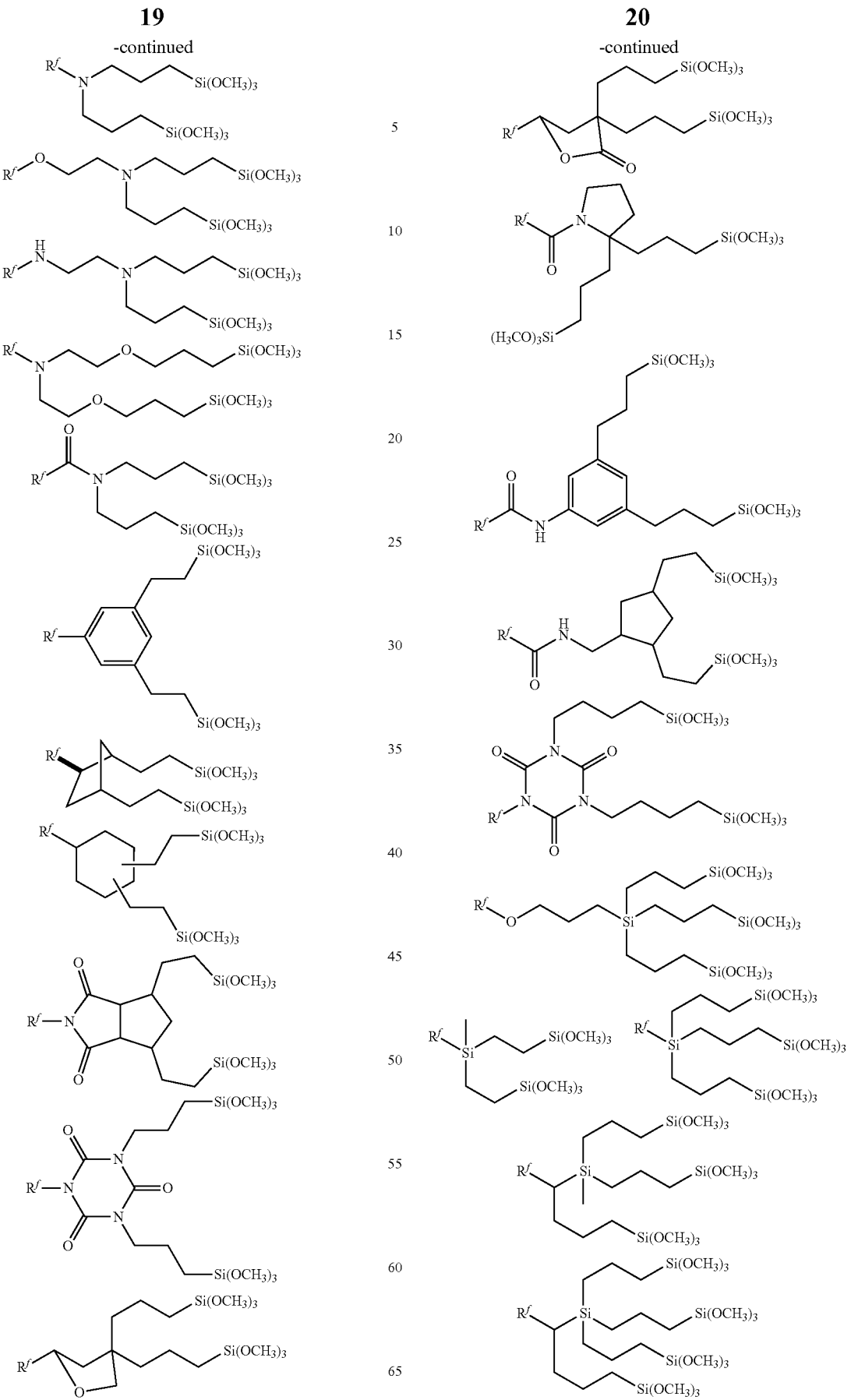

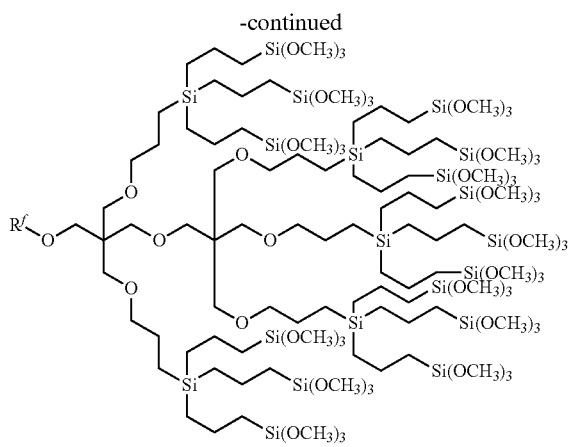
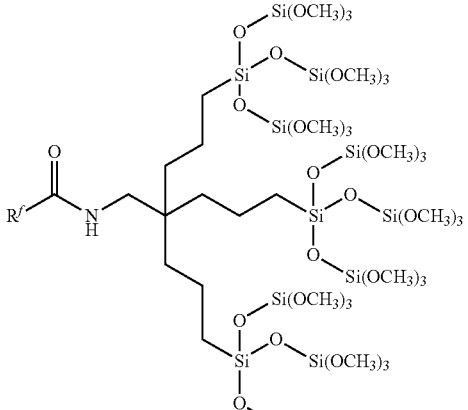
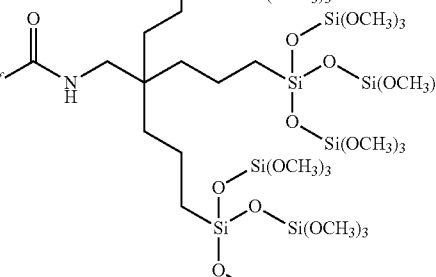
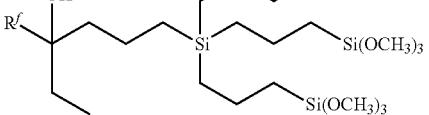
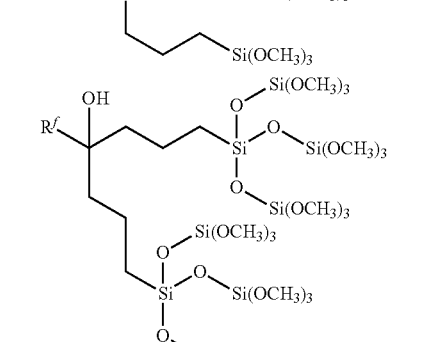
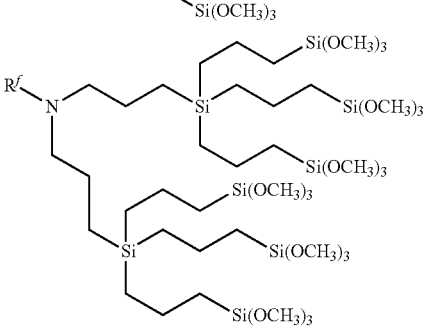
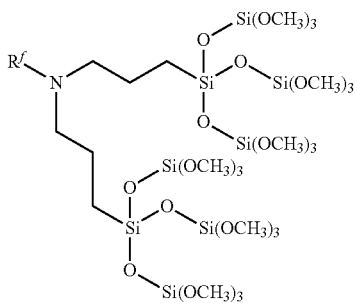

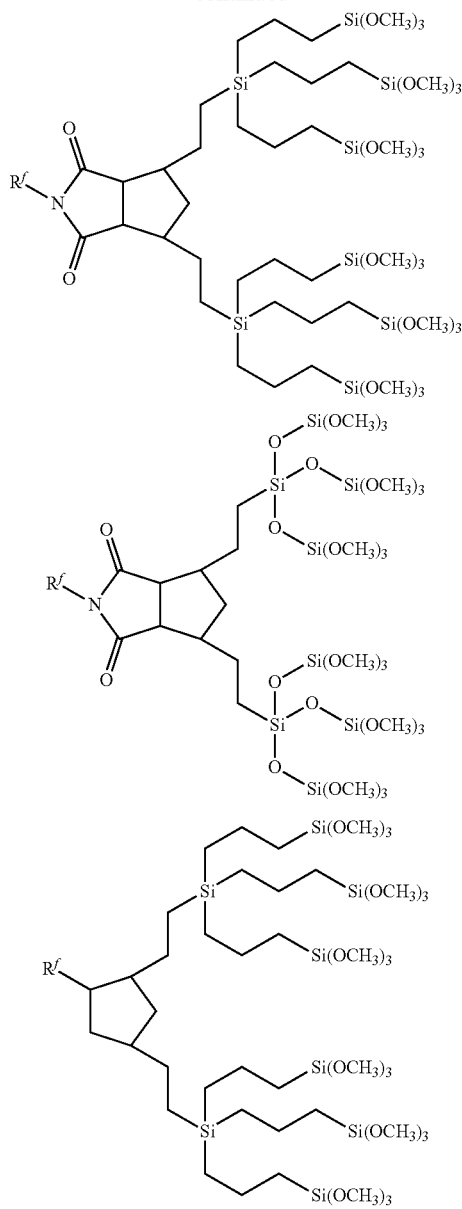
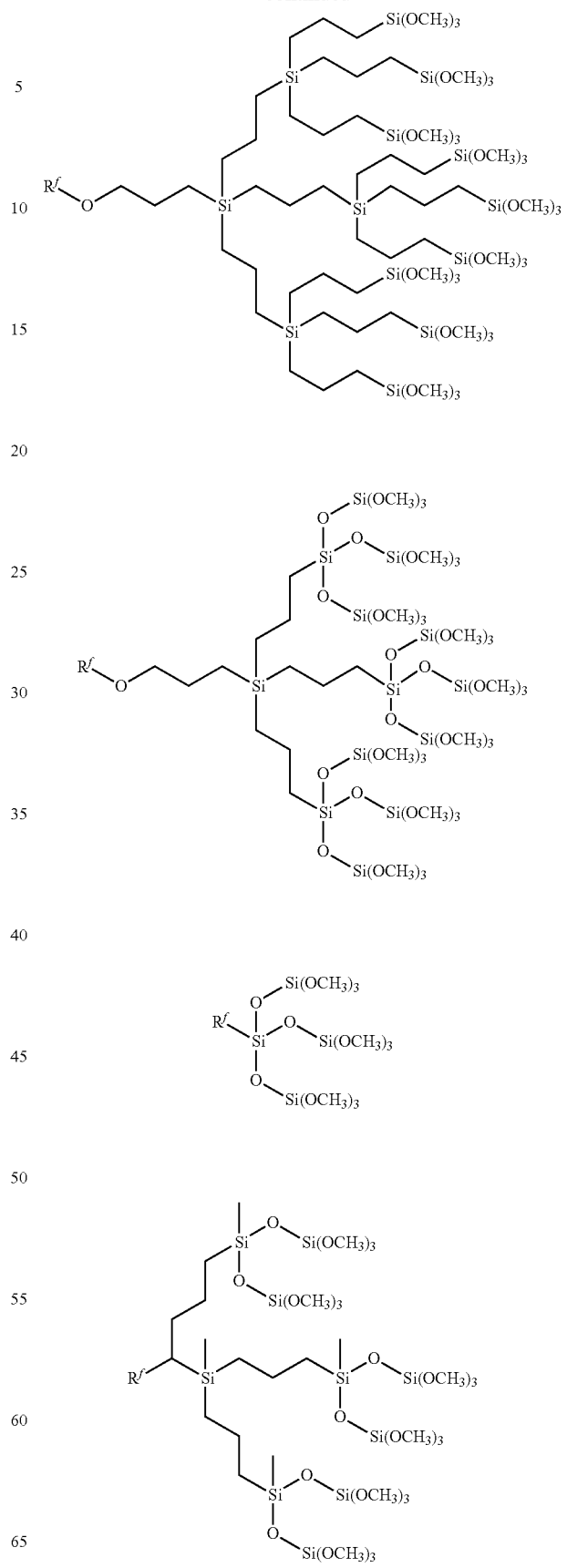

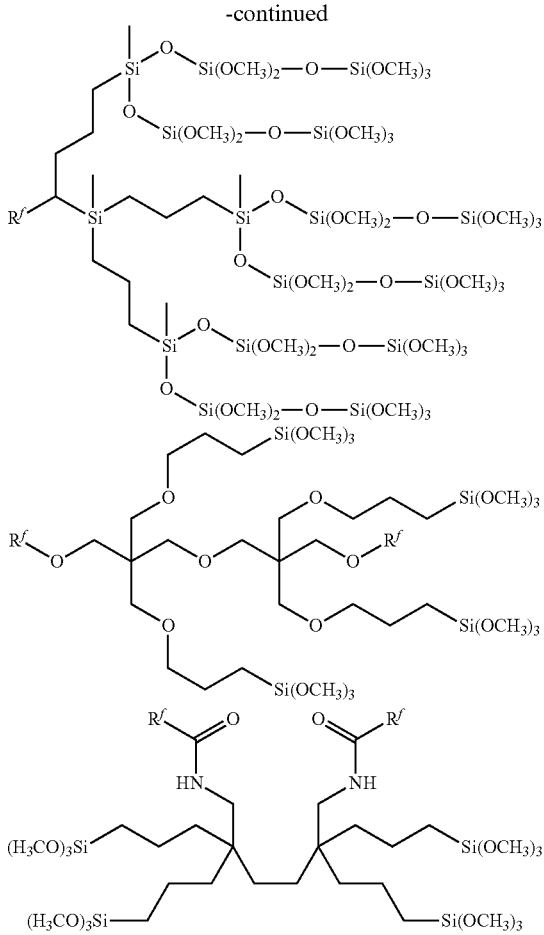

(Compound (A2))

Compound (A2) has a structure represented by the below-shown Formula (A2).

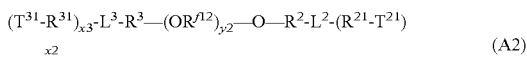

Note that the symbols in Formula (A2) are as described above.

$R^{f1}2$ and $(OR^{f1}2)_{y2}$ are similar to the above-described $R^{f11}$ and $(OR^{f11})^{y1}$, respectively, and their preferred aspects are also similar.

$R^2$ and $R^3$ are independent of each other and each of them is similar to the above-described $R^1$. Further, their preferred aspects are also similar.

Each of $R^{21}$ and $R^{31}$ is similar to the above-described $R^{11}$, and their preferred aspects are also similar. However, for $R^{21}$, the phrase "bonded to LN" is changed to "bonded to $L^2$" in the description below, and for $R^{31}$, it is changed to "bonded to $L^3$" in the description below. Further, for $R^{21}$, the phrase "bonded to $T^{11}$" is changed to "bonded to $T^{21}$" in the description below, and for $R^{31}$, it is changed to "bonded to $T^{31}$" in the description below. Note that when $L^2$ is a single bond, $R^{21}$ is directly bonded to $R^2$. Further, when $L^3$ is a single bond, $R^{31}$ is directly bonded to $R^3$.

$T^{21}$ and $T^{31}$ are independent of each other, and each of them is $-SiR^{a21}_{z21}R^{a22}_{3-z21}$. Further, $R^{a21}$, $R^{a22}$ and z21 are similar to $R^{a1}$, $R^{a2}$ and z1, respectively, constituting the above-described group (g1), and their preferred aspects are also similar.

Further, x2 and x3 are independent of each other, and each of them is similar to x1. Further, their preferred aspects are also similar.

$L^2$ and $L^3$ are independent of each other, and each of them is similar to the case of the above-described Li where j is set to 1.

For example, when $L^2$ and $L^3$ are single bonds, Compound (A2) is represented by the below-shown Formula (A2').

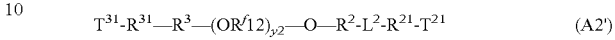

Note that the symbols in Formula (A2') are similar to those in Formula (A2).

When $L^2$ or $L^3$ is a group having a valency of 3 or higher, $L^2$ or $L^3$ has at least one branch point (hereinafter also referred to as a "branch point $P^2$") selected from the group consisting of C, N, Si, a ring structure, and an organo-polysiloxane residue having a valency of (1+x2) or (1+x3).

When N is the branch point $P^2$, the branch point $P^2$ is expressed, for example, as *—N(—**)$_2$. Note that * is the bonding hand on the $R^2$ or $R^3$ side, and ** is the bonding hand on the $R^{21}$ or $R^{31}$ side.

When C is the branch point $P^2$, the branch point $P^2$ is expressed, for example, as *—C(—**)$_3$ or *—CR$^{29}$(—**)$_2$. Note that * is a bonding hand on the $R^2$ or $R^3$ side, and ** is a bonding hand on the $R^{21}$ or $R^{31}$ side. Further, $R^{29}$ is a monovalent group, and its examples include a hydrogen atom, a hydroxyl group, an alkyl group, and an alkoxy group.

When Si is the branch point $P^2$, the branch point $P^2$ is expressed, for example, as *—Si(—**)$_3$ or *—SiR$^{29}$(—**)$_2$. Note that * is a bonding hand on the $R^2$ or $R^3$ side, and ** is a bonding hand on the $R^{21}$ or $R^{31}$ side. Further, $R^{29}$ is a monovalent group, and its examples include a hydrogen atom, a hydroxyl group, an alkyl group, and an alkoxy group.

The ring structure constituting the branch point $P^2$ and the organo-polysiloxane residue are similar to those of the above-described branch point $P^1$, and their preferred aspects are also similar.

Further, $L^2$ or $L^3$ having a valency of 2 or higher is independent of each other, and each of them may have the above-described bond $B^1$. The aspects of the bond $B^1$ are as described above, and its preferred aspects are also similar.

Regarding the divalent $L^2$ or $L^3$, the atoms bonded to $R^2$ and $R^{21}$ or $R^3$ and $R^{31}$ are independent of each other, and each of them is N, O, S, Si, or a carbon atom having an oxo group (=O). That is, each of the atoms adjacent to $R^2$ and $R^{21}$, or $R^3$ and $R^{31}$ is a constituent element of the bond $B^1$. Specific examples of the divalent $L^2$ or $L^3$ include a single bond and at least one bond $B^1$ (e.g., *—$B^1$—** and *—$B^1$—$R^{28}$—$B^1$—**). Note that $R^{28}$ is a single bond or a divalent organic group. Further, * is a bonding hand on the $R^2$ or $R^3$ side, and ** is a bonding hand on the $R^{21}$ or $R^{31}$ side.

Regarding $L^2$ or $L^3$ having a valency of 3 or higher, the atoms bonded to $R^2$ and $R^{21}$, or $R^3$ and $R^{31}$ are independent of each other, and each of them is N, O, S, Si, a carbon atom constituting a branch point, or a carbon atom having an oxo group (=O). That is, each of the atoms adjacent to $R^2$ and $R^{21}$, or $R^3$ and $R^{31}$ is a constituent element of the bond $B^1$ or the branch point $P^2$. Specific examples of $L^2$ or $L^3$ having a valency of 3 or higher include at least one branch point $P^2$ (e.g., {*—$P^2$, (—**)$_x$} or {*—$P^2$—$R^{28}$—$P^2$(—**)$_x$}) and a combination of at least one branch point $P^2$ and at least one bond $B^1$ (e.g., {*—$B^1$—$R^{28}$—$P^2$(—**)$_x$} or {*—$B^1$—$R^{28}$—$P^2$(—$R^{28}$—$B^1$—**)$_x$—}). Note that for $L^2$, x is x2, and for $L^3$, x is x3. $R^{28}$ is a single bond or a divalent organic group. Further, * is a bonding hand on the $R^2$ or $R^3$ side, and ** is a bonding hand on the $R^{21}$ or $R^{31}$ side.

The aspects of the above-described bond $R^{28}$ are as described above, and its preferred aspects are also similar.

For the ease of the manufacturing of a fluorine-containing ether compound, each of the above-described $L^2$ or $L^3$ is preferably a group represented by one of the below-shown Formulas (L21) to (L27).

  (L21)

  (L22)

  (L23)

  (L24)

  (L25)

  (L26)

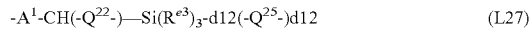  (L27)

Note that in Formulas (L21) to (L27), the $A^1$, $A^2$ or $A^3$ side is connected to $R^2$ or $R^3$, and the $Q^{22}$, $Q^{23}$, $Q^{24}$, $Q^{25}$ or $Q^{26}$ side is connected to $R^{21}$ or $R^{31}$.

Note that $A^1$, $A^2$, $A^3$, $Q^{11}$, $Q^{22}$, $Q^{23}$, $Q^{24}$, $Q^{25}$, $Q^{26}$, $R^{e1}$, $R^{e2}R^{e3}$ and $R^{e6}$ are similar to those in the description of the above-described $L^1$, and their preferred aspects are also similar.

$Z^1$ is a group having a ring structure having a valency of (1+d9), and having a carbon atom or a nitrogen atom to which $A^3$ is directly bonded and a carbon atom or a nitrogen atom to which $Q^{24}$ is directly bonded;

d2 is an integer of 0-3; d4 is an integer of 0-3; and d2+d4 is an integer of 1-5;
d6 is an integer of 1-3;
d9 is an integer of 1 or greater;
d11 is an integer of 1-3;
d12 is an integer of 1-3.

Note that each of d2+d4, d6, d9, d11, and 1+d12 is x2 or x3.

For the ease of the manufacturing of a fluorine-containing ether compound and to achieve a more excellent friction resistance and a fingerprint stain removal property of the surface layer, d9 is preferably 2-6, more preferably 2-4, and still more preferably 2 or 3.

Examples of other forms of the above-described $L^2$ or $L^3$ include groups represented by the below-shown Formulas (L31) to (L37).

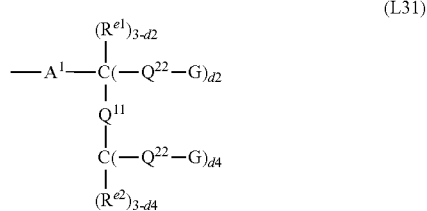  (L31)

  (L32)

  (L33)

  (L34)

  (L35)

  (L36)

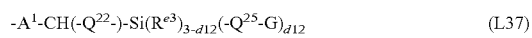  (L37)

Note that in Formulas (L31) to (L37), the $A^1$, $A^2$ or $A^3$ side is connected to $R^2$ or $R^3$, and the $Q^{22}$, $Q^{23}$, $Q^{24}$, $Q^{25}$ or $Q^{26}$ side is connected to $R^{21}$ or $R^{31}$. G is the above-described group (G21), and its preferred aspects are also similar. Symbols other than G are similar to those in Formulas (L21) to (L27), and their preferred aspects are also similar.

Examples of Compound (A2) include those shown below. Note that $Q^f$ is —$R^3$—$(OR^{f12})_{y2}$—O—$R^2$—.

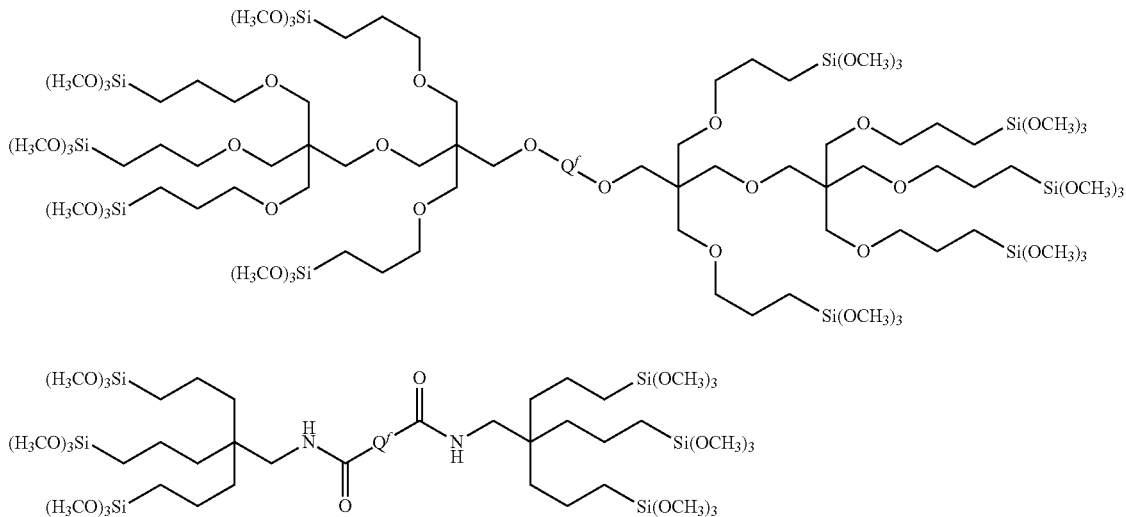

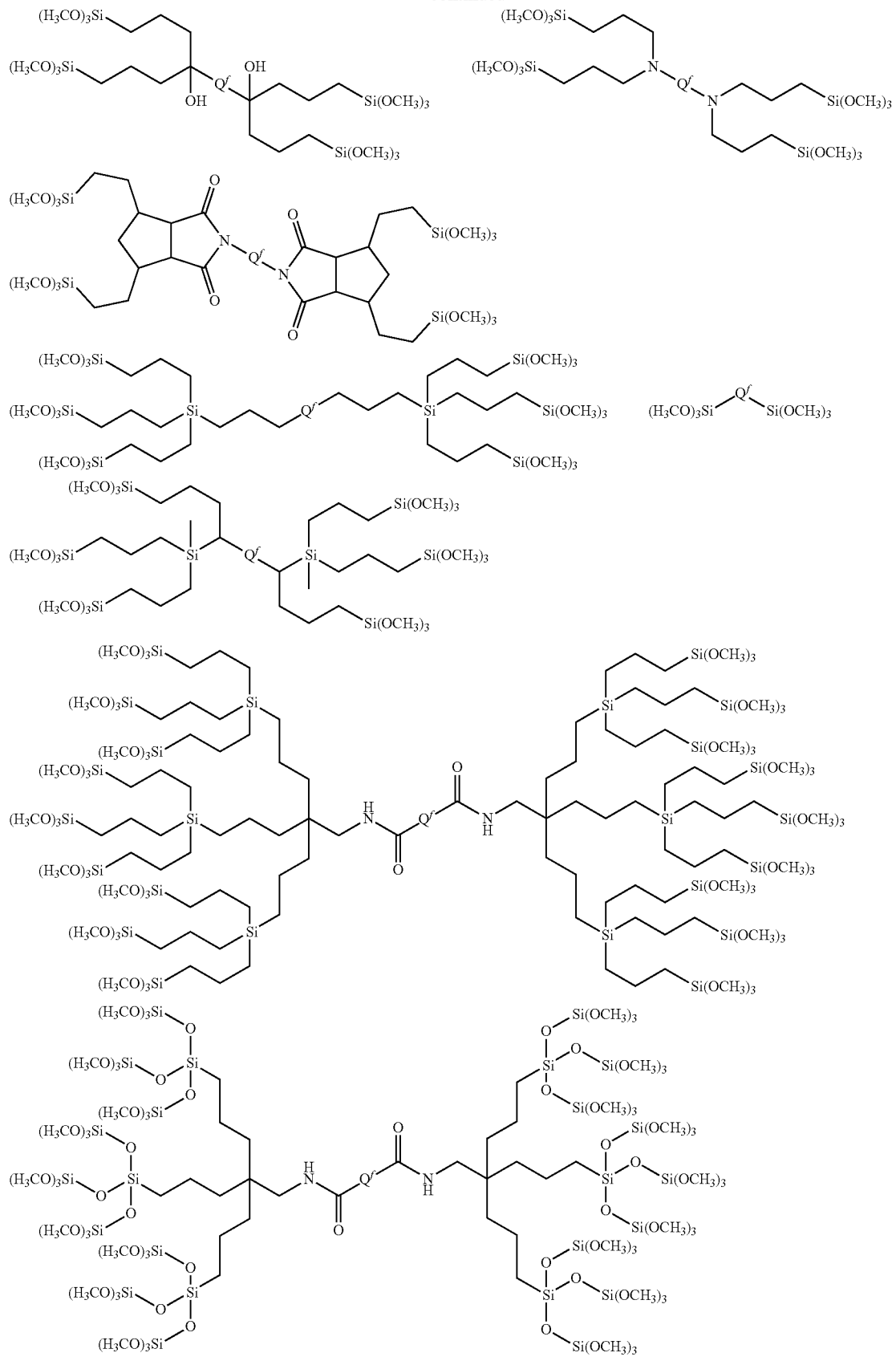

(Compound (A3))

Compound (A3) has a structure represented by the below-shown Formula (A3).

$$Q^1[(OR^{f13})_{y3}-O-R^4-T^4-(R^{41}-T^{41})_4]_{r1} \quad (A3)$$

Note that the symbols in Formula (A3) are as described above.

$R^{f13}$ and $(OR^{f13})_{y3}$ are similar to the above-described $R^{f11}$ and $(OR^{f11})_{y1}$, respectively, and their preferred aspects are also similar.

$R^4$ is similar to the above-described $R^1$, and its preferred aspects are also similar.

$R^{41}$ is similar to the above-described $R^{11}$, and its preferred aspects are also similar. However, "bonded to $L^1$" is changed to "bonded to $L^4$" in the description below. Further, "bonded to $T^{11}$" is changed to "bonded to $T^{41}$" in the description below. Note that when $L^4$ is a single bond, $R^{41}$ directly bonded to $R^4$.

$T^{41}$ is $-SiR^{a41}{}_{z41}R^{a42}{}_{3-z41}$, and $R^{a41}$, $R^{a42}$, and z41 are similar to $R^{a1}$, $R^{a2}$, and z1, respectively, constituting the above-described group (g1). Further, their preferred aspects are also similar.

x4 is similar to x1, and its preferred aspects are also similar.

$L^4$ is similar to $L^2$ or $L^3$, and its preferred aspects are also similar.

$Q^1$ is a group having a valency of r1 and having a branch point, and r1 is 3 or 4.

Examples of the branch point $P^3$ constituting $Q^1$ include N, C, Si and a ring structure. The number of branch points $P^3$ may be one, or may be two or more.

When N is the branch point $P^3$, the branch point $P^1$ is expressed, for example, as $N(-*)_3$ or $NR^{29}(-*)_2$.

When C is the branch point $P^3$, the branch point $P^3$ is expressed, for example, as $C(-*)_4$, $CR^{29}(-*)_3$, or $C(R^{29})_2(-*)_2$.

When Si is the branch point $P^3$, the branch point $P^3$ is expressed, for example, as $Si(-*)_4$, $SiR^{29}(-*)_3$, or $Si(R^{29})_2(-*)_2$. Note that * is the bonding hand on the $OR^{f13}$ side, and $R^{29}$ is a monovalent group. Examples of $R^{29}$ include a hydrogen atom, a fluorine atom, a hydroxyl group, an alkyl group, a fluoro-alkyl group, and a fluoro-polyether chain or the like having no $R^{41}-T^{41}$.

Examples of the ring structure constituting the branch point $P^3$ include those of the branch point $P^1$, and examples of the substituent of the ring structure include, in addition to the above-described substituents, a fluorine atom, a fluoro-alkyl group, and a fluoro-polyether chain having no $R^{41}-T^{41}$.

For the ease of the manufacturing of a fluorine-containing ether compound, the above-described $Q^1$ is preferably a group represented by one of the below-shown Formulas (Q1) to (Q8).

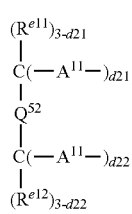

(Q1)

(Q2)

(Q3)

$$Z^1(-A^{13}-)_{d24} \quad (Q4)$$

$$Si(-A^{11}-)_{d25}(R^{e13})_{4-d25} \quad (Q5)$$

$$CH(-A^{11}-)_2-Si(R^{e13})_{3-d26}(-A^{11}-)_{d26} \quad (Q6)$$

(Q7)

(Q8)

Note that in Formulas (Q1) to (Q8), $A^{11}$, $A^{12}$ or $A^{13}$ is connected to $(OR^{f13})$ Note that $A^{11}$ is a single bond, $-R^{40}-$, or $-B^{13}-R^{40}-$; $R^{40}$ is an alkylene group, a fluoro-alkylene group, or a group having $-C(O)NR^{e7}-$, $-C(O)-$, $-NR^{e17}-$ or $-O-$ between carbon-carbon atoms of an alkylene group or a fluoro-alkylene group having a carbon number of 2 or greater; and $B^{13}$ is $-C(O)NR^{e6}-$, $-C(O)-$, $-NR^{e6}-$ or $-O-$;

$A^{12}$ is a single bond or $-R^{40}-$;

$A^{13}$ is $A^{11}$ when the atom in $Z^1$ to which $A^{13}$ is bonded is a carbon atom, and is $A^{12}$ when the atom in $Z^1$ to which $A^{13}$ is bonded is a nitrogen atom;

$Z^1$ is a group having a ring structure having a valency of r1 and having a carbon atom or a nitrogen atom to which $A^{13}$ is directly bonded;

$Q^{52}$ is a single bond, $-O-$, an alkylene group, or a group having $-C(O)NR^{e17}-$, $-C(O)-$, $-NR^{e17}-$ or $-O-$ between carbon-carbon atoms of an alkylene group or a fluoro-alkylene group having a carbon number of 2 or greater;

$R^{e11}$ is a hydrogen atom, a fluorine atom, an alkyl group, a fluoro-alkyl group, a fluoro-polyether chain having no $R^{41}-T^{41}$, or a group having a repetitive structure of $-Q^{52}-C(R^{e11})_{3-d21}(-A^{11}-)_{d21}$ in a range in which r1 is 3-4;

$R^{e12}$ is a hydrogen atom, a fluorine atom, a hydroxyl group, an alkyl group, a fluoro-alkyl group, or a fluoro-polyether chain having no $R^{41}-T^{41}$;

$R^{e13}$ is an alkyl group or a fluoro-alkyl group;

$R^{e14}$, $R^{e15}$, and $R^{e16}$ are independent of each other, and each of them is a hydrogen atom, a fluorine atom, an alkyl group, or a fluoro-alkyl group;

$R^{e17}$ is a hydrogen atom, an alkyl group having a carbon number of 1-6, a fluoro-alkyl group, or a fluorine-substituted phenyl group;

d21 is an integer of 0-3; d22 is an integer of 0-3; and d21+d22 is an integer of 3-4;

d23 is 3 or 4;

d24 is 3 or 4;

d25 is 3 or 4;

d26 is 1 or 2;

d27 is an integer of 1-3;

d28 is 1 or 2;

d29 is an integer of 1-3;

d30 is an integer of 1-3;

d31 is 1 or 2;

d32 is 1 or 2; and d33 is an integer of 1-3.

Note that when there are a plurality of $A^{11}$, the plurality of $A^1$ may be identical to each other or at least one of them is different from the others. The same applies to $A^{12}$, $A^{13}$, $R^{11}$, $R^{e12}$ and $R^{e13}$.

For the ease of the manufacturing of a fluorine-containing ether compound and to achieve a more excellent friction resistance, light stability, and a chemical resistance of the surface layer, the carbon number of the alkylene group or the fluoro-alkylene group of $R^{41}$ is preferably 1-10, more preferably 1-6, and still more preferably 1-4.

Meanwhile, the lower limit value of the carbon number of the alkylene group in the case where the alkylene group has a specific bond between carbon-carbon atoms is 2.

Examples of the ring structure in $Z^1$ include the above-described ring structure, and its preferred aspects are also similar to those of the above-described ring structure.

In $R^{e11}$, $R^{e12}$, $R^{e13}$, $R^{e14}$, $R^{e15}$, and $R^{e16}$, for the ease of the manufacturing of a fluorine-containing ether compound, the carbon number of the alkyl group or the fluoro-alkylene group is preferably 1-6, more preferably 1-3, and still more preferably 1-2.

Examples of Compound (A3) include those shown below. Note that $R^{f3}$ is $(OR^{f13})_{y3}$—O—$R^4$.

-continued

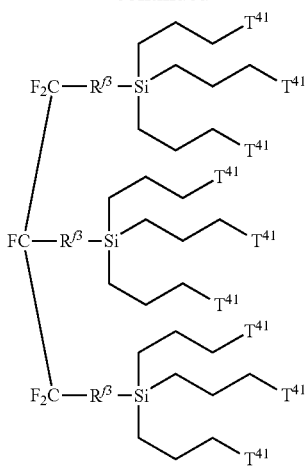

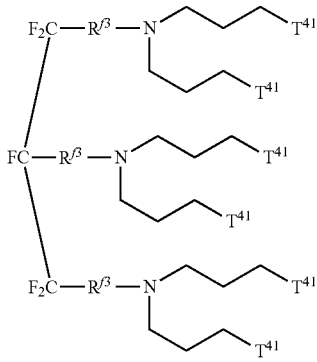

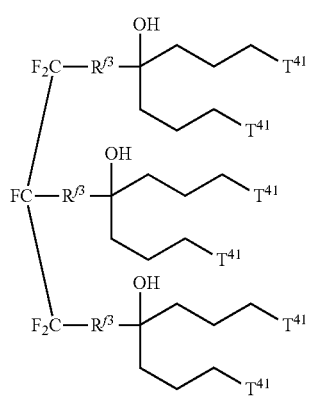

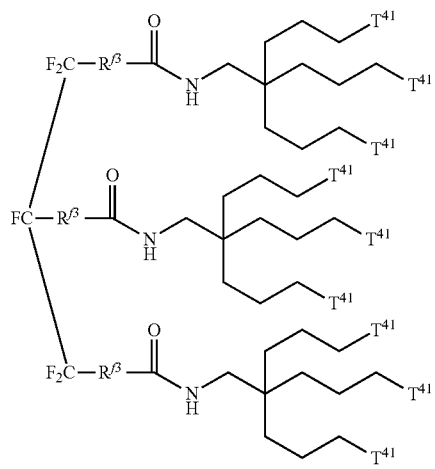

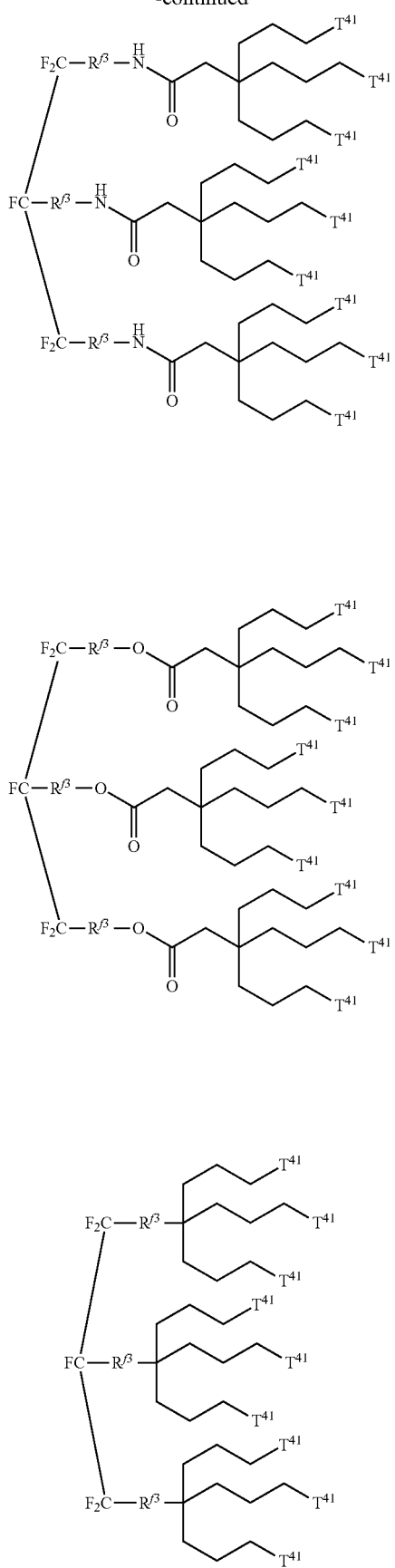
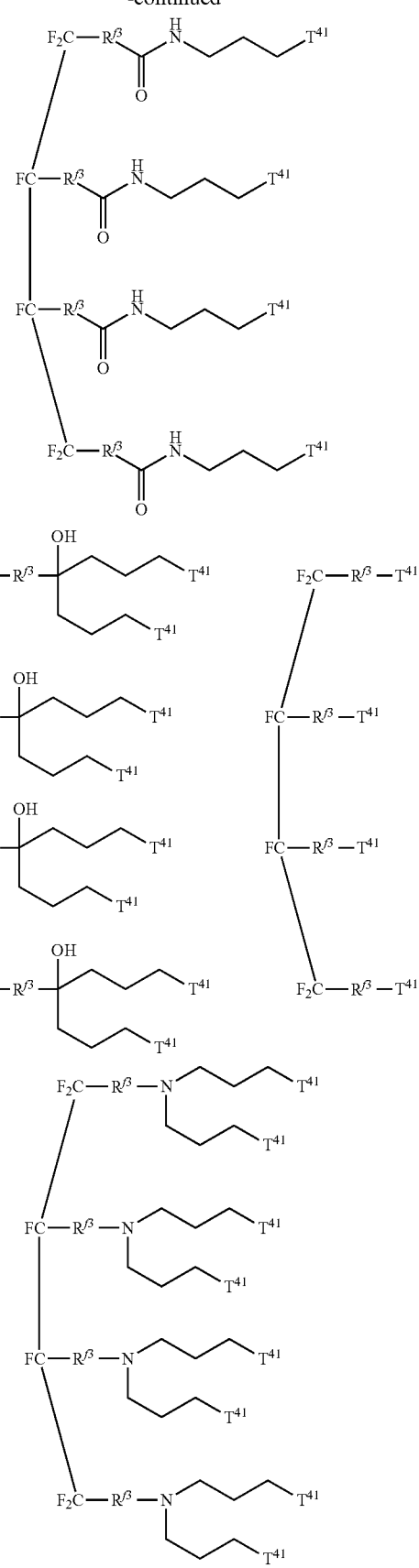

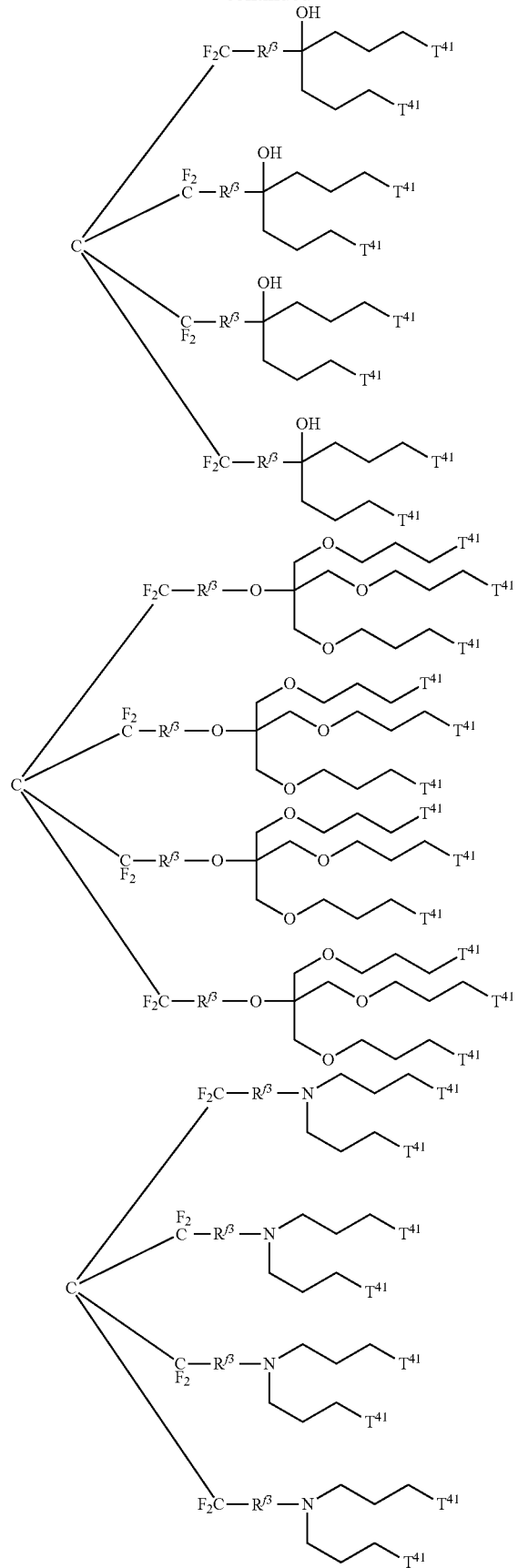
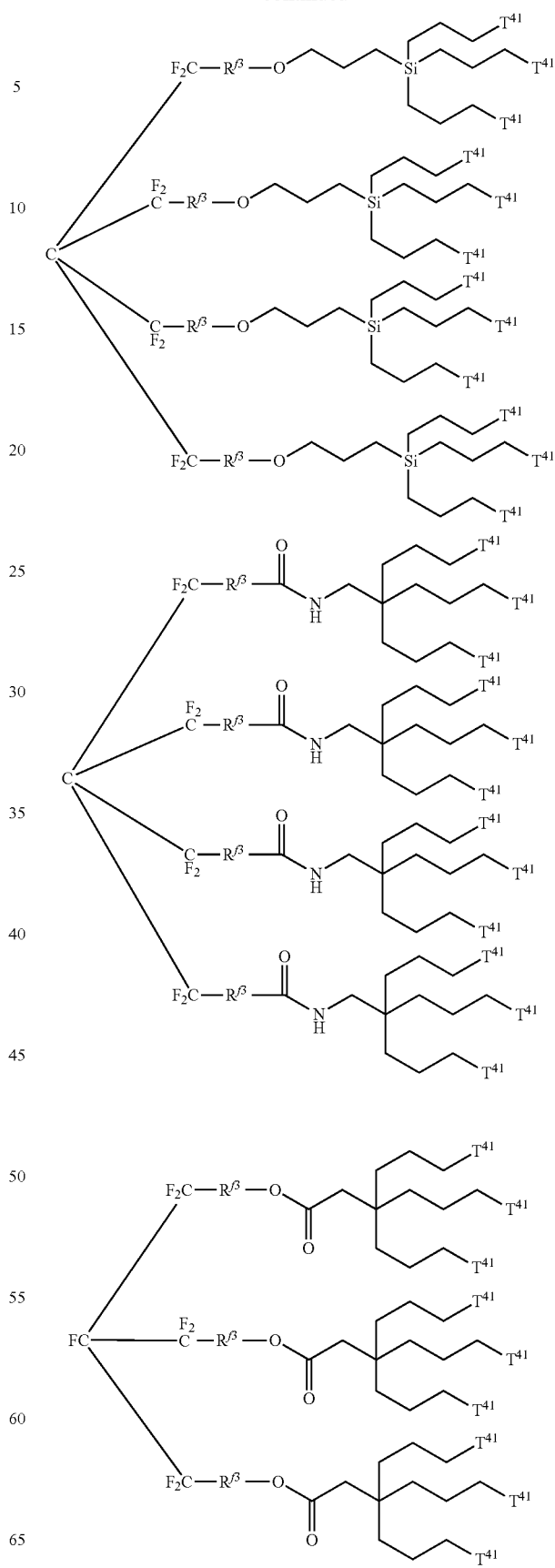

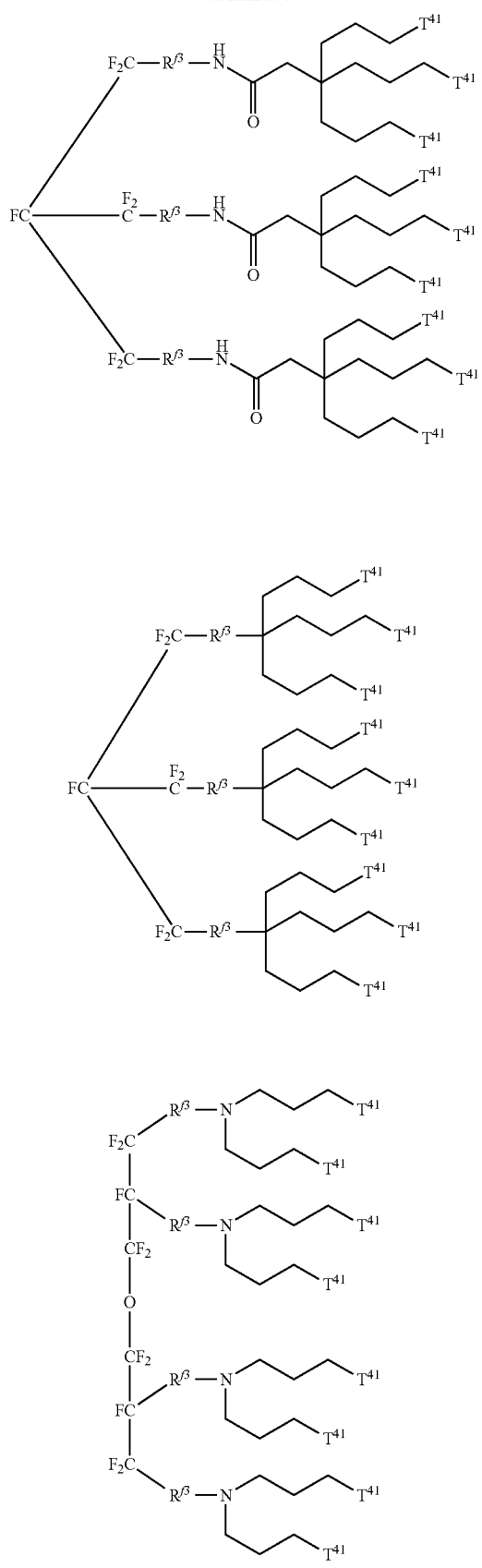
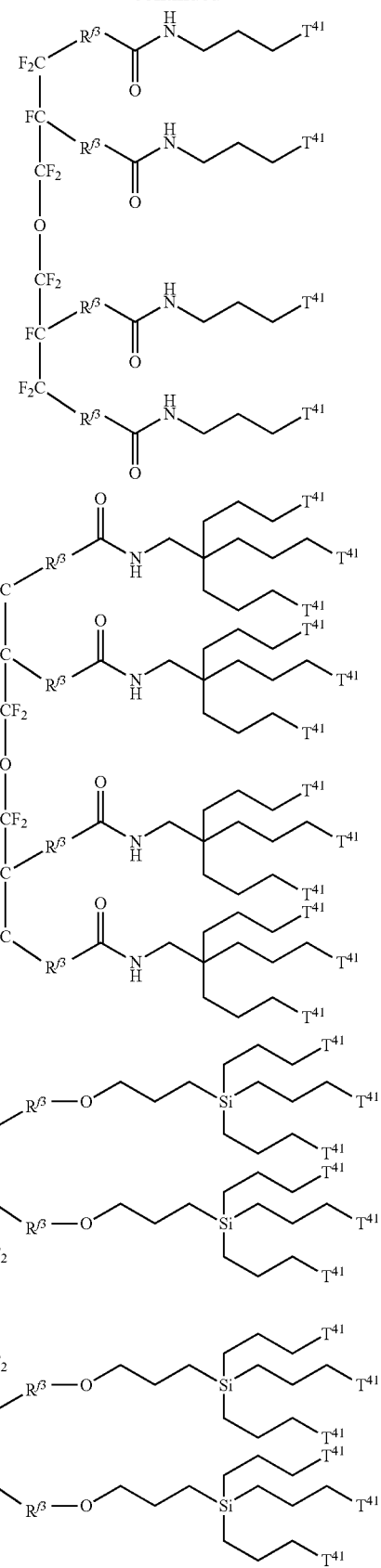

(Content)

The content of the fluorine-containing ether compound is preferably 0.01-50 mass %, more preferably 0.03-40 mass %, and still more preferably 0.05-30 mass % based on the total mass of the surface treatment agent. When the content of the fluorine-containing ether compound is in the above-described range, the surface layer is excellent in water and oil repellency, friction resistance, fingerprint stain removal property, lubricity, and appearance.

<Metal Compound>

The surface treatment agent contains a first metallic compound containing a first metallic element and a second metallic compound containing a second metallic element different from the first metallic element.

In this specification, the term "metallic compound" is a collective term for the "first metallic compound" and the "second metallic compound", and the term "metallic element" is a collective term for the "first metallic element" and the "second metallic element".

A metallic compound is a compound containing a metallic element(s) and another element(s) other than the metallic element, and its specific examples include an oxide containing a metallic element, a salt containing a metallic element, a complex containing a metallic element, a metal alkoxide containing a metallic element, and a metal halide. In particular, to achieve a more excellent friction resistance of the surface layer, the metallic compound is preferably an acetate containing a metallic element, a metal alkoxide containing a metallic element, a complex containing a metallic element, and a metal halide.

The metallic element means any of elements in Groups 1 to 12 in the periodic table excluding a hydrogen atom (including lanthanoids and actinoids) and base metals (Al, Ga, In, Tl, Sn, Pb and Bi).

To achieve a more excellent friction resistance of the surface layer, the electronegativity of the first metallic element is preferably higher than 1.00 and more preferably 2.00 or higher. The details of the reason why the friction resistance of the surface layer is improved by using such a metallic element having a high electronegativity, i.e., a metallic element having an electronegativity higher than 1.00, are not clarified. However, it is inferred that this is because reactivity between a silanol group derived from a reactive silyl group of the fluorine-containing ether compound and a silanol group present in the surface of the substrate or the like is improved even further.

When the electronegativity of the first metallic element is higher than 1.00, the second metallic element may be any metallic element different from the first metallic element, and the electronegativity of the second metallic element may be higher than 1.00, or may be 1.00 or lower.

In the surface treatment agent, when the first metallic element is a metallic element having an electronegativity of 2.00 or higher, the second metallic element is preferably a metallic element having an electronegativity of 1.00 or lower or a metallic element having an electronegativity higher than 1.00 and lower than 2.00. In this way, the surface layer has a more excellent friction resistance.

To achieve a more excellent friction resistance of the surface layer, the metallic element having an electronegativity higher than 2.00 is preferably ruthenium (Ru, 2.20), rhodium (Rh, 2.28), palladium (Pd, 2.20), iridium (Ir, 2.20), platinum (Pt, 2.28), or lead (Pb, 2.33), and more preferably Pd or Pt.

To achieve a more excellent friction resistance of the surface layer, examples of the metallic element having an electronegativity higher than 1.00 and lower than 2.00 include magnesium (Mg, 1.31), aluminum (Al, 1.61), titanium (Ti, 1.54), chromium (Cr, 1.66), manganese (Mn, 1.55), iron (Fe, 1.83), nickel (Ni, 1.91), copper (Cu, 1.90), zinc (Zn, 1.65), niobium (Nb, 1.6), silver (Ag, 1.93), cadmium (Cd, 1.69), tin (Sn, 1.96), and thallium (Tl, 1.62). Further, the metallic element having an electronegativity higher than 1.00 and lower than 2.00 is preferably Mg, Al, Ti, Cr, Ni, Cu, Zn, or Sn, and more preferably Mg, Cu, or Sn.

To achieve a more excellent friction resistance of the surface layer, the metallic element having an electronegativity of 1.00 or lower is preferably sodium (Na, 0.93), potassium (K, 0.82), lithium (Li, 0.98), calcium (Ca, 1.00), or cesium (Cs, 0.79), and more preferably Na or K.

Note that numerical values next to symbols of elements in parentheses indicate Pauling electronegativity values.

Preferred embodiments of combinations of metallic compounds contained in the surface treatment agent will be described hereinafter.

Embodiment 1: An embodiment containing a first metallic compound containing a first metallic element having an electronegativity of 2.00 or higher and a second metallic compound containing a second metallic element having an electronegativity higher than 1.00 and lower than 2.00

Embodiment 2: An embodiment containing a first metallic compound containing a first metallic element having an electronegativity of 2.00 or higher and a second metallic compound containing a second metallic element having an electronegativity of 1.00 or lower Embodiment 3: An embodiment containing a first metallic compound containing a first metallic element having an electronegativity higher than 1.00 and lower than 2.00 and a second metallic compound containing a second metallic element having an electronegativity of 1.00 or lower Embodiment 4: An embodiment containing a first metallic compound containing a first metallic element having an electronegativity of 2.00 or higher and a second metallic compound containing a second metallic element having an electronegativity of 2.00 or higher Embodiment 5: An embodiment containing a first metallic compound containing a first metallic element having an electronegativity higher than 1.00 and lower than 2.00 and a second metallic compound containing a second metallic element having an electronegativity higher than 1.00 and lower than 2.00 Among the above-described Embodiments 1 to 5, to achieve a more excellent friction resistance of the surface layer, Embodiments 1 to 3 are preferred; Embodiments 1 and 2 are more preferred; and Embodiment 1 is still more preferred.

As Embodiment 1, a combination of one of Pd and Pt, which is used as the first metallic compound, and one of Mg, Cu, Zn, and Sn, which is used as the second metallic compound, is preferred, and combinations of Pt and Mg, Pt and Cu, Pt and Sn, Pt and Zn, and Pd and Mg are particularly preferred.

As Embodiment 2, a combination of Pt and K is preferred.

As Embodiment 3, combinations of Cu and Na, and Mg and K are preferred.

Specific examples of metallic compounds include magnesium methoxide, magnesium ethoxide, copper methoxide, copper ethoxide, tetra-n-butoxytin, chloroplatinic acid, palladium acetate, potassium methoxide, potassium ethoxide, sodium methoxide, sodium ethoxide, and zinc chloride.

The total content of the first and second metallic compounds is preferably 0.001 mass ppb to 5 mass %, more preferably 0.01 mass ppb to 3 mass %, and still more preferably 0.1 mass ppb to 1 mass % based on the total mass of the surface treatment agent. When the total content is 0.001 mass ppb or more, the surface layer has a more excellent friction resistance. When the total content is 5 mass % or less, the surface layer has more excellent water and oil repellency.

To achieve a more excellent friction resistance of the surface layer, the content of the first metallic compound is preferably 0.001 mass ppb to 5 mass %, more preferably 0.01 mass ppb to 3 mass %, and still more preferably 0.1 mass ppb to 1 mass % based on the total mass of the surface treatment agent.

To achieve a more excellent friction resistance of the surface layer, the content of the second metallic compound is preferably 0.001 mass ppb to 5 mass %, more preferably 0.01 mass ppb to 3 mass %, and still more preferably 0.1 mass ppb to 1 mass % based on the total mass of the surface treatment agent.

The total content of the first and second metallic compounds is preferably 0.001 mass ppm to 5 mass %, more preferably 0.01 mass ppm to 3 mass %, and still more preferably 0.1 mass ppm to 1 mass % based on the total mass of the fluorine-containing ether compound contained in the surface treatment agent. When the content of the metallic compounds is 0.001 mass ppm or more, the surface layer has a more excellent friction resistance. When the content of the metallic compound is 5 mass % or less, the surface layer has more excellent water and oil repellency.

To achieve a more excellent friction resistance of the surface layer, the content of the first metallic compound is preferably 0.001 mass ppm to 5 mass %, more preferably 0.01 mass ppm to 3 mass %, and still more preferably 0.1 mass ppm to 1 mass % based on the total mass of the fluorine-containing ether compound contained in the surface treatment agent.

To achieve a more excellent friction resistance of the surface layer, the mass ratio of the content of the first metallic compound to that of the second metallic compound (Content of first metallic compound/Content of second metallic compound) is preferably 0.00001-100,000, more preferably 0.0001-10,000, and still more preferably 0.001-1,000.

<Other Components>

The surface treatment agent according to the present disclosure may contain components other than the fluorine-containing ether compound and the metallic compound (hereinafter also referred to as "other components").

Specific examples of other components include fluorine-containing compounds other than the above-described fluorine-containing ether compound, at least one of the below-shown impurities, and liquid mediums.

Examples of other fluorine-containing compounds include fluorine-containing compounds that are generated as by-products during the manufacturing process of the above-described fluorine-containing ether compound (hereinafter also referred to as "by-product fluorine-containing compounds") and known fluorine-containing compounds used for purposes similar to that of the above-described fluorine-containing ether compound.

As the other fluorine-containing compounds, a compound that is unlikely to deteriorate the properties of the above-described fluorine-containing ether compound is preferred.

To make the fluorine-containing ether compound fully exhibit its properties, the content of other fluorine-containing compounds is preferably less than 70 mass %, more preferably less than 50 mass %, still more preferably less than 20 mass %, particularly preferably less than 10 mass %, and most preferably less than 5 mass % based on the total mass of the surface treatment agent.

Examples of by-product fluorine-containing compounds include fluorine-containing compounds or the like that are not reacted during the synthesis of the fluorine-containing ether compound. In the case where the composition according to the present disclosure contains a by-product fluorine-containing compound, it is possible to simplify a purification process for removing the by-product fluorine-containing compound or reducing the amount of the by-product fluorine-containing compound.

Examples of known fluorine-containing compounds include those disclosed in the below-listed literatures.

Perfluoro-polyether-modified aminosilane disclosed in Japanese Unexamined Patent Application Publication No. H11-029585;

Silicon-containing organic fluorine-containing polymers disclosed in Japanese Patent No. 2874715;

Organosilicon compounds disclosed in Japanese Unexamined Patent Application Publication No. 2000-144097;

Perfluoro-polyether-modified aminosilane disclosed in Japanese Unexamined Patent Application Publication No. 2000-327772;

Fluorinated siloxane disclosed in Published Japanese Translation of PCT International Publication for Patent Application, No. 2002-506887;

Organosilicone compounds disclosed in Published Japanese Translation of PCT International Publication for Patent Application, No. 2008-534696;

Fluorinated modified hydrogen-containing polymers disclosed in Japanese Patent No. 4138936;

Compounds disclosed in United States Patent Application Publication No. 2010/0129672, International Patent Publication No. WO2014/126064, and Japanese Unexamined Patent Application Publication No. 2014-070163;

Organosilicon compounds disclosed in International Patent Publication No. WO2011/060047 and International Patent Publication No. WO2011/059430;

Fluorine-containing organosilane compounds disclosed in International Patent Publication No. WO2012/064649;

Fluoro-oxyalkylene group-containing polymers disclosed in Japanese Unexamined Patent Application Publication No. 2012-72272;

Fluorine-containing ether compounds disclosed in International Patent Publication No. WO2013/042732, International Patent Publication No. WO2013/121984, International Patent Publication No. WO2013/121985, International Patent Publication No. WO2013/121986, International Patent Publication No. WO2014/163004, Japanese Unexamined Patent Application Publication No. 2014-080473, International Patent Publication No. WO2015/087902, International Patent Publication No. WO2017/038830, International Patent Publication No. WO2017/038832, and International Patent Publication No. WO2017/187775;

Perfluoro-(poly)ether-containing silane compounds disclosed in Japanese Unexamined Patent Application Publication No. 2014-218639, International Patent Publication No. WO2017/022437, International Patent Publication No. WO2018/079743, and International Patent Publication No. WO2018/143433;

Fluoro-polyether group-containing polymer-modified silane disclosed in Japanese Unexamined Patent Application Publication No. 2015-199906, Japanese Unexamined Patent Application Publication No. 2016-204656, Japanese Unexamined Patent Application Publication No. 2016-210854, and Japanese Unexamined Patent Application Publication No. 2016-222859;
Fluorine-containing ether compounds disclosed in International Patent Publication No. WO2018/216630, International Patent Publication No. WO2019/039226, International Patent Publication No. WO2019/039341, International Patent Publication No. WO2019/039186, International Patent Publication No. WO2019/044479, Japanese Unexamined Patent Application Publication No. 2019-44158, and International Patent Publication No. WO2019/163282.

Further, examples of commercially available products of fluorine-containing compounds include KY-100 series (KY-178, KY-185, KY-195, etc.) manufactured by Shin-Etsu Chemical Co., Ltd., SURECO (Registered Trademark) AF series such as SURECO 2101S manufactured by AGC Inc., and OPTOOL (Registered Trademark) DSX, OPTOOL (Registered Trademark) AES, OPTOOL (Registered Trademark) UF503, OPTOOL (Registered Trademark) UD509 manufactured by Daikin Industries, Ltd.

When the surface treatment agent contains another fluorine-containing compound(s), the content of the other fluorine-containing compound(s) in the surface treatment agent is preferably 60 mass % or less, more preferably 30 mass % or less, and still more preferably 10 mass % or less based on the total content of the above-described fluorine-containing ether compound and the other fluorine-containing compound(s).

The total content of the above-described fluorine-containing ether compound and the other fluorine-containing compound(s) in the surface treatment agent is preferably 0.01 mass % or more and more preferably 0.03 mass % or more.

When the content of the above-described fluorine-containing ether compound and the other fluorine-containing compound(s) is within the above-described range, the surface layer is excellent in water and oil repellency, friction resistance, fingerprint stain removal property, lubricity, and appearance.

When the surface treatment agent contains a liquid medium, the surface treatment agent can be used as a coating liquid. The coating liquid may be any type of liquid such as a solution or a dispersion liquid.

As the liquid medium, an organic solvent is preferred. The organic solvent may be a fluorine-based organic solvent or a non-fluorine-based organic solvent, or may contain both solvents.

Examples of the fluorine-based organic solvent include fluorinated alkanes, fluorinated aromatic compounds, fluoro-alkyl ethers, fluorinated alkylamines, and fluoro-alcohols.

As the fluorinated alkane, a compound having a carbon number of 4-8 is preferred. Examples of commercially available products include $C_6F_{13}H$ (Manufactured by AGC Inc., Asahi Clin (Registered Trademark) AC-2000), $C_6F_{13}C_2H_5$ (Manufactured by AGC Inc., Asahi Clin (Registered Trademark) AC-6000), and $C_2F_5CHFCHFCF_3$ (Manufactured by The Chemours Company, Bartrell (Registered Trademark) XF).

Specific examples of fluorinated aromatic compounds include hexafluoro-benzene, trifluoro-methylbenzene, perfluoro-toluene, and bis(trifluoro-methyl)benzene. As the fluoro-alkyl ether, a compound having a carbon number of 4-12 is preferred. Examples of commercially available products include $CF_3CH_2OCF_2CF_2H$ (Manufactured by AGC Inc., Asahi Clin (Registered Trademark) AE-3000), $C_4F_9OCH_3$ (Manufactured by 3M, Noveck (Registered Trademark) 7100), $C_4F_9OC_2H_5$ (Manufactured by 3M, Noveck (Registered Trademark) 7200), and $C_2F_5CF(OCH_3)C_3F_7$ (Manufactured by 3M, Noveck (Registered Trademark) 7300).

Specific examples of fluorinated alkylamines include perfluoro-tripropylamine and perfluoro-tributylamine.

Specific examples of fluoro-alcohols include 2,2,3,3-tetrafluoro-propanol, 2,2,2-trifluoro-ethanol, and hexafluoro-isopropanol.

Preferred examples of non-fluorine-based organic solvents include a compound consisting of only hydrogen atoms and carbon atoms, and a compound consisting of hydrogen atoms, carbon atoms, and oxygen atoms. Further, its examples include a hydrocarbon organic solvent, an alcohol-based organic solvent, a ketone-based organic solvent, an ether-based organic solvent, and an ester-based organic solvent.

When the surface treatment agent contains a liquid medium, the surface treatment agent preferably contains 60-99.999 mass % of the liquid medium, more preferably 85-99.99 mass % of the liquid medium, and still more preferably 90-99.9 mass % of the liquid medium.

The surface treatment agent may further contain a known additive(s) such as an acid catalyst or a basic catalysts that promotes the hydrolysis and the condensation reaction of the hydrolytic silyl group.

The content of additives is preferably 10 mass % or less and more preferably 1 mass % or less based on the total mass of the surface treatment agent.

[Article]

An article according to the present invention preferably includes a substrate and a surface layer disposed on the substrate, and has an underlayer between the substrate and the surface layer.

The surface layer is a layer formed from the above-described surface treatment agent and contains a condensate of the above-described fluorine-containing ether compound.

The material and shape of the substrate may be selected as appropriate according to the use or the like of the article. Examples of materials for the substrate include glass, resins, sapphire, metals, ceramics, stone, and composite materials thereof. The glass may be chemically reinforced. In particular, examples of substrates required to be water- and oil-repellent include substrates for touch panels, substrates for displays, and substrates from which housings of electronic apparatuses are formed. Substrates for touch panels and substrates for displays are transparent or translucent. "Transparent or translucent" means that a visible-light transmittance when light is incident at right angles according to JIS R3106:1998 (ISO 9050:1990) is 25% or higher. As the material for the substrate for a touch panel, glass or a transparent resin is preferred.

The substrate may be one of which a surface on which an underlayer is provided has been subjected to a surface treatment such as a corona discharge treatment, a plasma treatment, and a plasma graft polymerization treatment. The surface, which has been subjected to the surface treatment, has a more excellent adhesive property between the substrate and the underlayer, and as a result, the friction resistance of the surface layer is improved even further. To achieve a more excellent friction resistance of the surface layer, the surface treatment may be preferably a corona discharge treatment or a plasma treatment.

The underlayer is preferably a layer containing an oxide containing silicon (preferably, silicon oxide), and may contain other elements. When the underlayer contains silicon oxide, the reactive silyl group of the above-described fluorine-containing ether compound is dehydrated and condensed, and an Si—O—Si bond is thereby formed between the substrate and the underlayer, so that s surface layer having an excellent friction resistance is formed.

The content of the silicon oxide in the underlayer is preferably 65 mass % or more, more preferably 80 mass % or more, still more preferably 85 mass % or more, and particularly preferably 90 mass % or more. When the content of the silicon oxide is equal to or higher than the lower limit value, the Si—O—Si bond is sufficiently formed in the underlayer, so that mechanical properties of the underlayer are sufficiently ensured. The content of the silicon oxide corresponds to the remnant, i.e., what is obtained by excluding the sum total of the total content of the other elements (in the case of the oxide, the oxide equivalent amount) from the mass of the underlayer.

In view of the durability of the surface layer, the oxide in the underlayer preferably further contains at least one element selected from the group consisting of alkali metal elements, alkali earth metal elements, platinum group elements, boron, aluminum, phosphorus, titanium, zirconium, iron, nickel, chromium, molybdenum, and tungsten. By containing these elements, the bond between the underlayer and the fluorine-containing ether compound is strengthened, so that the friction resistance is improved.

The thickness of the underlayer is preferably 1-200 nm and still more preferably 2-20 nm. When the thickness of the underlayer is equal to or larger than the lower limit value, the effect of improving the adhesive property obtained by the underlayer is more likely to be sufficiently obtained. When the thickness of the underlayer is equal to or shorter than the upper limit value, the friction resistance of the underlayer itself increases. Examples of methods for measuring the thickness of an underlayer include the observation of a cross section of the underlayer by an electron microscope (such as SEM and TEM) and methods using an optical interference film thickness meter, a spectroscopic ellipsometer, a step gauge, or the like.

Examples of methods for forming an underlayer include a method in which a vapor-deposition material having a desired composition of an underlayer is vapor-deposited (i.e., is evaporated and deposited) on the surface of a substrate.

An example of the vapor-deposition method is a vacuum vapor-deposition method.

The vacuum vapor-deposition method is a method in which a vapor-deposition material is evaporated in a vacuum tank and the evaporated vapor-deposition material is made to adhere onto the surface of a substrate.

The temperature of the vapor-deposition (e.g., when a vacuum vapor-deposition apparatus is used, the temperature of a boat in which a vapor-deposition material is put) is preferably 100-3,000° C. and more preferably 500-3,000° C.

The pressure of the vapor-deposition (e.g., when a vacuum vapor-deposition apparatus is used, the absolute pressure in a tank in which a vapor-deposition material is put) is preferably 1 Pa or lower and more preferably 0.1 Pa or lower.

When an underlayer is formed by using a vapor-deposition material, one deposition material may be used or two or more deposition materials containing different elements may be used.

Examples of methods for evaporating a vapor-deposition material include a resistance heating method in which a vapor-deposition material is melted and evaporated on a resistance heating boat made of metal having a high melting point and an electron-gun method in which the surface of a vapor-deposition material is melted and evaporated by irradiating the vapor-deposition material with an electron beam and thereby directly heating the vapor-deposition material. As the method for evaporating a vapor-deposition material, the electron-gun method is preferred because a vapor-deposition material can locally heated, so that even a substance having a high melting point can be evaporated. Further, temperatures are low in places where the electron beam is not incident, so there is no risk of the reaction with the container and the contamination with impurities.

As the vapor-deposition material used for the electron gun method, a molten granular material or a sintered body is preferred because they are less likely to scatter even when an air flow occurs.

The surface layer includes a condensate of the above-described fluorine-containing ether compound. The condensate of the fluorine-containing ether compound includes a structure in which a silanol group (Si—OH) is formed through a hydrolysis reaction of a hydrolytic silyl group contained in the fluorine-containing ether compound, and an Si—O—Si bond is formed through an intermolecular condensation reaction of the silanol group, and a structure in which an Si—O—Si bond is formed through a condensation reaction of a silanol group contained in the fluorine-containing ether compound with a silanol group or an Si-OM group (note that M is an alkali metal element) present on the surface of the substrate or the underlayer. Further, the surface layer may also contain a condensate of a fluorine-containing compound other than the fluorine-containing ether compound. That is, the surface layer contains a fluorine-containing compound having a reactive silyl group in a state in which some or all of reactive silyl groups contained the fluorine-containing compound have undergone a condensation reaction.

The thickness of the surface layer is preferably 1-100 nm and more preferably 1-50 nm. When the thickness of the surface layer is equal to or larger than the lower limit value, the effect by the surface layer can be sufficiently obtained. When the thickness of the surface layer is equal to or smaller than the upper limit value, the use efficiency is high.

The thickness of the surface layer is a thickness obtained (measured) by an X-ray diffractometer for thin film analysis. The thickness of the surface layer can be calculated from the oscillation cycle of an interference pattern of a reflected X-ray obtained by an X-ray reflectivity method using an X-ray diffractometer for thin film analysis.

The article is preferably a touch panel. In this case, the surface layer is preferably formed on the surface of a member constituting the surface of the touch panel which is touched by fingers.

[Method for Manufacturing Article]

The method for manufacturing an article is a method for forming a surface layer on a substrate by a dry- or wet-coating method by using the surface treatment agent according to the present disclosure.

When the surface treatment agent does not contain a liquid medium, the surface treatment agent can be used as it is in the dry-coating method. Examples of the dry-coating method include vacuum vapor-deposition, CVD, and sputtering. The vacuum vapor-deposition method can be suitably used because it suppresses the decomposition of the fluorine-containing ether compound and the apparatus is simple.

For the vacuum vapor-deposition, a pellet-like substance in which a fluorine-containing ether compound and a metallic compound are supported in a metal porous body made of a metal material such as iron or steel may be used. The pellet-like material in which the fluorine-containing ether compound and the metallic compound are supported can be manufactured by impregnating a metal porous body with the surface treatment agent containing a liquid medium, and drying the metal porous body and thereby removing the liquid medium therefrom.

When the surface treatment agent contains a liquid medium, the surface treatment agent can be suitably used in a wet-coating method. Examples of the wet-coating method include a spin coating method, a wipe coating method, a spray coating method, a squeegee coating method, a dip coating method, a die coating method, an inkjet method, a flow coating method, a roll coating method, a casting method, a Langmuir-Blodgett method, and a gravure coating method.

In order to improve the friction resistance of the surface layer, if necessary, an operation to promote the reaction of the fluorine-containing ether compound with the substrate (or underlayer) may be performed. Examples of such an operation include heating, humidification, and light irradiation. For example, it is possible, by heating the substrate including a surface layer formed thereon in an atmosphere containing moisture, to promote reactions such as a hydrolysis reaction of a hydrolytic group, a reaction between a hydroxyl group or the like on the surface of a substrate and a silanol group, and the generation of a siloxane bond through a condensation reaction of a silanol group.

After the surface treatment, if necessary, compounds in the surface layer that are not chemically bonded to other compounds or the substrate may be removed. Its specific examples include a method for pouring a solvent over a surface layer and a method for wiping off such compounds with a cloth soaked with a solvent.

EXAMPLES

The present invention will be described hereinafter in a more detailed manner by using examples. Examples 1 to 17 are examples according to the present disclosure, and Examples 18 to 23 are comparative examples. Note that the present invention is not limited to these examples. Note that the amount of each component in the tables described later indicates a value expressed by mass.

[Manufacturing of Fluorine-containing Ether Compound X1] A fluorine-containing ether compound X1 was obtained in a manner similar to a method disclosed in Example 11 of International Patent Publication No. WO2017/038830.

CF$_3$—(OCF$_2$CF$_2$OCF$_2$CF$_2$CF$_2$CF$_2$)n(OCF$_2$CF$_2$)—
OCF$_2$CF$_2$CF$_2$—C(O)NH—CH$_2$—
CLCH$_2$CH$_2$CH$_2$—Si(OCH$_3$)$_{33}$ (X1)

In the formula, an average value of n was 13, and the number-average molecular weight of the fluorine-containing ether compound X1 was 5,400.

[Manufacturing of Fluorine-Containing Ether Compound X2]

A control compound 1 disclosed in Japanese Unexamined Patent Application Publication No. 2019-131807 was used as a fluorine-containing ether compound X2.

(X2)

[Manufacturing of Fluorine-Containing Ether Compound X3]

A control compound 2 disclosed in Japanese Unexamined Patent Application Publication No. 2019-131807 was used as a fluorine-containing ether compound X3.

(X3)

[Preparation of Surface Treatment Agent 1]

The fluorine-containing ether compound X1 and C$_4$F$_9$OC$_2$H$_5$ (Noveck-7200: product name, manufactured by 3M), which was used as a liquid medium, were mixed, and a solution containing 10 mass % of the fluorine-containing ether compound was thereby obtained.

30 g of the obtained solution, 0.03 g of diethoxymagnesium (manufactured by Kojundo Chemical Lab. Co., Ltd.), and 0.03 g of chloroplatinic acid (manufactured by KANTO KAGAKU) were mixed, and a surface treatment agent 1 was thereby obtained.

[Preparation of Surface Treatment Agents 2 to 23]

Surface treatment agents 2 to 23 were obtained in a manner similar to that of the preparation of the surface treatment agent 1 except that at least one of the type of the fluorine-containing ether compound, the type of the metallic compound, and the amount of the added metallic compound was changed as shown in Tables 1 and 2. Further, methanol or ethanol was added to each of the surface treatment agents 18 to 20, and the amounts of methanol or ethanol in these surface treatment agents are shown in Table 2.

The metallic compounds listed in Tables 1 and 2 are roughly described below.

Mg(OCH$_2$CH$_3$)$_2$: Diethoxymagnesium, manufactured by Kojundo Chemical Lab. Co., Ltd.

Cu(OCH$_3$)$_2$: Copper methoxide, manufactured by sigma-aldrich

Sn(O-n-C$_4$H$_9$)$_4$: Tetra-n-butoxytin, manufactured by Kojundo Chemical Lab. Co., Ltd.

H$_2$PtCl$_6$: Chloroplatinic acid, manufactured by KANTO KAGAKU

Pd(OCOCH$_3$)$_2$: Palladium(II) acetate, manufactured by Tokyo Chemical Industry Co., Ltd.

KOCH$_3$: Potassium methoxide, manufactured by sigma-aldrich

NaOCH$_3$: Sodium methoxide, manufactured by KANTO KAGAKU

ZnCl$_2$: Zinc chloride, manufactured by Fujifilm Wako Pure Chemical Corporation

TABLE 1

| | | | Surface treatment agent | | | | | | |
|---|---|---|---|---|---|---|---|---|---|
| | | | 1 | 2 | 3 | 4 | 5 | 6 | 7 |
| Fluorine-containing ether compound | X1 | Unit: g | 3 | 3 | 3 | 3 | 3 | 3 | 3 |
| | X2 | Unit: g | | | | | | | |
| | X3 | Unit: g | | | | | | | |
| Metal compound | Mg(OCH$_2$CH$_3$)$_2$ | Unit: g | 0.03 | 0.0000003 | | | | 0.0000003 | |
| | Cu(OCH$_3$)$_2$ | Unit: g | | | 0.03 | | | | 0.0000003 |
| | Sn(O-n-C$_4$H$_9$)$_4$ | Unit: g | | | | 0.0000003 | | | |
| | ZnCl$_2$ | Unit: g | | | | | | | |
| | H$_2$PtCl$_6$ | Unit: g | 0.03 | 0.0000003 | 0.03 | 0.0000003 | 0.0000003 | | |

TABLE 1-continued

|  |  |  | 1 | 2 | 3 | 4 | 5 | 6 | 7 |
|---|---|---|---|---|---|---|---|---|---|
|  | Pd(OCOCH₃)₂ | Unit: g |  |  |  |  |  | 0.0000003 |  |
|  | KOCH₃ | Unit: g |  |  |  |  | 0.0000003 |  |  |
|  | NaOCH₃ | Unit: g |  |  |  |  |  |  | 0.0000003 |
| Liquid medium | Noveck-7200 | Unit: g | 27 | 27 | 27 | 27 | 27 | 27 | 27 |
|  | ethanol | Unit: g |  |  |  |  |  |  |  |
|  | methanol | Unit: g |  |  |  |  |  |  |  |

| | | | Surface treatment agent | | | | |
|---|---|---|---|---|---|---|---|
| | | | 8 | 9 | 10 | 11 | 12 |
| Fluorine-containing ether compound | X1 | Unit: g | 3 | 3 | 3 | 3 | 3 |
|  | X2 | Unit: g |  |  |  |  |  |
|  | X3 | Unit: g |  |  |  |  |  |
| Metal compound | Mg(OCH₂CH₃)₂ | Unit: g | 0.0000003 |  | 0.0000003 |  |  |
|  | Cu(OCH₃)₂ | Unit: g |  |  | 0.0000003 |  |  |
|  | Sn(O-n-C₄H₉)₄ | Unit: g |  |  |  |  |  |
|  | ZnCl₂ | Unit: g |  |  |  | 0.03 | 0.0000003 |
|  | H₂PtCl₆ | Unit: g |  | 0.0000003 |  | 0.03 | 0.0000003 |
|  | Pd(OCOCH₃)₂ | Unit: g |  | 0.0000003 |  |  |  |
|  | KOCH₃ | Unit: g | 0.0000003 |  |  |  |  |
|  | NaOCH₃ | Unit: g |  |  |  |  |  |
| Liquid medium | Noveck-7200 | Unit: g | 27 | 27 | 27 | 27 | 27 |
|  | ethanol | Unit: g |  |  |  |  |  |
|  | methanol | Unit: g |  |  |  |  |  |

TABLE 2

| | | | Surface treatment agent | | | | | | | | | | |
|---|---|---|---|---|---|---|---|---|---|---|---|---|---|
| | | | 13 | 14 | 15 | 16 | 17 | 18 | 19 | 20 | 21 | 22 | 23 |
| Fluorine-containing ether compound | X1 | Unit: g | 3 |  |  | 3 | 3 | 3 | 3 | 3 | 3 |  |  |
|  | X2 | Unit: g |  | 3 |  |  |  |  |  |  |  | 3 |  |
|  | X3 | Unit: g |  |  | 3 |  |  |  |  |  |  |  | 3 |
| Metal compound | Mg(OCH₂CH₃)₂ | Unit: g |  |  |  | 0.06 |  |  |  |  |  |  |  |
|  | Cu(OCH₃)₂ | Unit: g | 0.01 | 0.01 | 0.01 |  |  |  |  | 0.03 | 0.01 | 0.01 | 0.01 |
|  | Sn(O-n-C₄H₉)₄ | Unit: g |  |  |  |  |  |  |  |  |  |  |  |
|  | H₂PtCl₆ | Unit: g | 0.01 | 0.01 | 0.01 | 0.06 |  | 0.0000003 |  |  |  |  |  |
|  | Pd(OCOCH₃)₂ | Unit: g |  |  |  |  |  |  |  |  |  |  |  |
|  | KOCH₃ | Unit: g |  |  |  |  | 0.0000003 |  | 0.0000003 |  |  |  |  |
|  | NaOCH₃ | Unit: g |  |  |  |  | 0.0000003 |  |  |  |  |  |  |
| Liquid medium | Noveck-7200 | Unit: g | 27 | 27 | 27 | 27 | 27 | 27 | 27 | 27 | 27 | 27 | 27 |
|  | ethanol | Unit: g |  |  |  |  |  |  |  | 0.03 |  |  |  |
|  | methanol | Unit: g |  |  |  |  |  | 0.0000003 |  | 0.0000003 |  |  |  |

Examples 1 to 23

Each of the surface treatment agents obtained as described above was vacuum vapor-deposited on a glass substrate (Dragontrail (Registered Trademark), manufactured by AGC Inc., 50 mm×50 mm, 0.5 mm thick). Specifically, each of the surface treatment agents 1 to 21 (0.5 g) was charged into a resistance heating boat in a vacuum vapor-deposition apparatus (manufactured by ULVAC, VTR 350M), and the vacuum vapor-deposition apparatus was evacuated to a pressure of $3.0 \times 10^{-3}$ Pa or lower. Next, a silicon dioxide film having a thickness of 5 nm was formed on the above-described glass substrate, and the resistance heating boat was heated, so that a film was formed on the glass. Next, the glass with the vapor-deposition film formed thereon was left undisturbed for 30 minutes under an atmosphere of a temperature of 150° C., and then left undisturbed to be cooled to a room temperature, so that a surface layer was formed on the substrate. As a result, glass substrates each including a surface layer formed thereon according to Examples 1 to 23 (surface treatment agents 1 to 23) were obtained.

[Friction Resistance Test]

The evaluation samples according to Examples 1 to 23 were horizontally positioned, and the surfaces of the surface layers of them were brought into contact with the below-shown friction element (the contact surface had a circular shape having a diameter of 1 cm). Then, a load of 5 N was applied on each of them. After that, the friction element was reciprocated at a speed of 40 mm/sec while keeping the application of the load. The friction element was reciprocated 10,000 times, during which the static contact angle of water was measured every 1,000 times of reciprocation (i.e., every 1,000 time of friction). The test was stopped when the measured static contact angle of water became smaller than 90°.

As the static contact angle of water, a drop of 2 μL pure water was deposited on the surface layer, and the contact angle with respect to the water was measured by using a contact angle meter (Kyowa Interface Science Co., Ltd.: Automatic contact angle meter DropMaster 701). As the static contact angle of water, an arithmetic average value of five different points was recorded.

The evaluation criteria were as follows, and results are shown in Tables 3 and 4.

<Friction Element>

The surface (diameter 1 cm) of the below-shown silicone rubber processed article was covered with cotton soaked with artificial sweat having the below-shown composition, and the obtained article was used as a friction element.

(Silicone Rubber Processed Article)

A silicone rubber stopper SR-51 (manufactured by Tigers Polymer Corporation) was processed into a cylindrical shape having a diameter of 1 cm and a thickness of 1 cm, and the obtained article was used as a silicone rubber processed article.

(Composition of Artificial Sweat)
Anhydrous disodium hydrogen phosphate: 2 g
Sodium chloride: 20 g
85% lactic acid: 2 g
Histidine hydrochloride: 5 g
Distilled water: 1 kg <Evaluation Criteria>
A (Excellent): Static contact angle of water was 900 or larger even after friction of 10,000 times.
B (Good): Static contact angle of water did not become smaller than 90° after friction of 7,000 times, but became smaller than 90° before or when friction was performed 10,000 times.
C (Unacceptable): Static contact angle of water became smaller than 90° before or when friction was performed 7,000 times.

TABLE 3

|  | Example 1 | Example 2 | Example 3 | Example 4 | Example 5 | Example 6 |
| --- | --- | --- | --- | --- | --- | --- |
| Type of surface treatment agent | 1 | 2 | 3 | 4 | 5 | 6 |
| Friction resistance test | A | A | A | A | A | A |

|  | Example 7 | Example 8 | Example 9 | Example 10 | Example 11 | Example 12 |
| --- | --- | --- | --- | --- | --- | --- |
| Type of surface treatment agent | 7 | 8 | 9 | 10 | 11 | 12 |
| Friction resistance test | A | A | B | B | A | A |

TABLE 4

|  | Example 13 | Example 14 | Example 15 | Example 16 | Example 17 | Example 18 | Example 19 | Example 20 | Example 21 | Example 22 | Example 23 |
| --- | --- | --- | --- | --- | --- | --- | --- | --- | --- | --- | --- |
| Type of surface treatment agent | 13 | 14 | 15 | 16 | 17 | 18 | 19 | 20 | 21 | 22 | 23 |
| Friction resistance test | A | A | A | B | B | C | C | C | C | C | C |

[Alkaline Immersion Test]

An O-ring made of PTFE (polytetrafluoroethylene) and having a diameter of 1 cm was placed on the surface layer of each of the evaluation samples according to Examples 13 to 15 and 21 to 23, and an 8N aqueous sodium hydroxide solution was dropped inside the above-described O-ring, so that the surface of the surface layer was brought into contact with the aqueous sodium hydroxide solution. 90 and 120 minutes after the contact with the aqueous sodium hydroxide solution, the aqueous sodium hydroxide solution was wiped off, washed with pure water and ethanol, and then the contact angle with respect to water was measured.

Note that the contact angle with respect to water was measured in a manner similar to that of the friction resistance test.

The evaluation criteria were as follows, and results are shown in Table 5.

<Evaluation Criteria>
- A: Static contact angle of water after 120 minutes was 900 or larger.
- B: Static contact angle of water after 90 minutes was 90° or larger, but the static contact angle of water after 120 minutes was smaller than 900.
- C: Static contact angle of water after 90 minutes was smaller than 90°.

TABLE 5

| | Example 13 | Example 14 | Example 15 | Example 21 | Example 22 | Example 23 |
|---|---|---|---|---|---|---|
| Type of surface treatment agent | 13 | 14 | 15 | 21 | 22 | 23 |
| Alkaline immersion test | B | B | A | C | C | A |

As shown in Tables 3 and 4, it was confirmed that the use of a surface treatment agent containing a fluorine-containing ether compound and two or more metallic elements makes it possible to form a surface layer having an excellent friction resistance (Examples 1 to 15).

Further, as shown in Table 5, it was confirmed that the use of a surface treatment agent containing a fluorine-containing ether compound having a structure expressed as $(OCF_2)_{m1}$·$(OCF_2CF_2)_{m2}$ and two or more metallic elements makes it possible to form a surface layer having an excellent alkali resistance (Example 15).

According to the present invention, it is possible to provide a surface treatment agent that makes it possible to form a surface layer having an excellent friction resistance and a water- and oil-repellent property on a surface of various articles, and to provide an article including such a surface layer. As an example, the article is useful for an optical article, a touch panel, an antireflection film, antireflection glass, $SiO_2$-treated glass, tempered glass, sapphire glass, a quartz substrate, a mold metal, and the like.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A surface treatment agent, comprising:
    a fluorine-containing ether compound including a fluoropolyether chain and a reactive silyl group;
    a first metallic compound including a first metallic element, wherein the first metallic element is Pd or Pt; and
    a second metallic compound including a second metallic element different from the first metallic element,
    wherein the fluorine-containing ether compound has a hydrolytic group at one terminal and a non-hydrolytic group at the other terminal.

2. The surface treatment agent according to claim 1, wherein the second metallic element in the second metallic compound is a metallic element having a Pauling electronegativity of 1.00 or lower or a metallic element having a Pauling electronegativity higher than 1.00 and lower than 2.00.

3. The surface treatment agent according to claim 1, wherein the total content of the first and second metallic compounds is in a range of 0.1 mass ppb to 1 mass % based on a total mass of the surface treatment agent.

4. The surface treatment agent according to claim 1, wherein the total content of the first and second metallic compounds is in a range of 0.1 mass ppb to 1 mass % based on a total mass of the fluorine-containing ether compound in the surface treatment agent.

5. The surface treatment agent according to claim 1, further comprising:
    a liquid medium.

6. An article, comprising:
    a surface layer formed on a substrate,
    wherein the surface layer is formed by a process comprising coating the surface treatment agent of claim 1 on the substrate.

7. A method for manufacturing an article, comprising:
    forming a surface layer on a substrate by a dry-coating method or a wet-coating method,
    wherein the forming includes coating the surface treatment agent of claim 1.

8. The surface treatment agent according to claim 1, wherein the total content of the first and second metallic compounds is in a range of 0.1 mass ppb to 1 mass % based on a total mass of the surface treatment agent.

9. The surface treatment agent according to claim 1, wherein the total content of the first and second metallic compounds is in a range of 0.1 mass ppb to 1 mass % based on a total mass of the fluorine-containing ether compound in the surface treatment agent.

10. The surface treatment agent according to claim 2, wherein the total content of the first and second metallic compounds is in a range of 0.1 mass ppb to 1 mass % based on a total mass of the surface treatment agent.

11. The surface treatment agent according to claim 2, wherein the total content of the first and second metallic compounds is in a range of 0.1 mass ppb to 1 mass % based on a total mass of the fluorine-containing ether compound in the surface treatment agent.

12. The surface treatment agent according to claim 1, wherein the second metallic element in the second metallic compound is a metallic element having a Pauling electronegativity higher than 1.00 and lower than 2.00.

13. The surface treatment agent according to claim 1, wherein the second metallic element in the second metallic compound is a metallic element having a Pauling electronegativity of 1.00 or lower.

14. The surface treatment agent according to claim 1, wherein a total content of the first and second metallic compounds is in a range of 0.1 mass ppb to 3 mass % based on a total mass of the fluorine-containing ether compound in the surface treatment agent.

15. The surface treatment agent according to claim 1, wherein the second metallic element in the second metallic compound is selected from the group consisting of Pd, Pt, Mg, Cu, Zn, Sn, K and Na.

16. The surface treatment agent according to claim 1, wherein the second metallic element in the second metallic compound is selected from the group consisting of Mg, Cu, Sn, Na and K.

17. The surface treatment agent according to claim 1, wherein the second metallic element in the second metallic compound is selected from the group consisting of Pd, Pt, Mg, Cu, Zn, Sn, K and Na.

18. The surface treatment agent according to claim 2, wherein the total content of the first and second metallic compounds is in a range of 0.1 mass ppb to 1 mass % based on a total mass of the surface treatment agent.

19. The surface treatment agent according to claim 2, wherein the total content of the first and second metallic compounds is in a range of 0.1 mass ppb to 1 mass % based on a total mass of the fluorine-containing ether compound in the surface treatment agent.

20. The surface treatment agent according to claim 3, wherein the total content of the first and second metallic compounds is in a range of 0.1 mass ppb to 1 mass % based on a total mass of the fluorine-containing ether compound in the surface treatment agent.

* * * * *